US010661174B2

(12) United States Patent
Minato et al.

(10) Patent No.: US 10,661,174 B2
(45) Date of Patent: May 26, 2020

(54) IMAGE GENERATION SYSTEM, IMAGE GENERATION METHOD, AND INFORMATION STORAGE MEDIUM

(71) Applicant: BANDAI NAMCO Entertainment Inc., Tokyo (JP)

(72) Inventors: Kazuhisa Minato, Toyonaka (JP); Mitsugu Makino, Yokohama (JP); Futoshi Matsushita, Saitama (JP); Motonaga Ishii, Tokyo (JP)

(73) Assignee: BANDAI NAMCO GAMES INC., Tokyo (JP)

( * ) Notice: Subject to any disclaimer, the term of this patent is extended or adjusted under 35 U.S.C. 154(b) by 718 days.

(21) Appl. No.: 15/232,121

(22) Filed: Aug. 9, 2016

(65) Prior Publication Data

US 2016/0346693 A1    Dec. 1, 2016

Related U.S. Application Data

(63) Continuation of application No. PCT/JP2015/053804, filed on Feb. 12, 2015.

(30) Foreign Application Priority Data

Feb. 13, 2014   (JP) ................................. 2014-025962

(51) Int. Cl.
*A63F 13/00*    (2014.01)
*A63F 13/577*   (2014.01)
(Continued)

(52) U.S. Cl.
CPC .......... *A63F 13/577* (2014.09); *A63F 13/213* (2014.09); *A63F 13/219* (2014.09);
(Continued)

(58) Field of Classification Search
CPC ..................................................... A63F 13/837
See application file for complete search history.

(56) References Cited

U.S. PATENT DOCUMENTS

2002/0022518 A1* 2/2002 Okuda ................... A63F 13/08
                                                          463/36
2003/0011535 A1   1/2003 Kikuchi et al.
(Continued)

FOREIGN PATENT DOCUMENTS

JP    H08-117447 A    5/1996
JP    2001-004327 A   1/2001
(Continued)

OTHER PUBLICATIONS

May 19, 2015 Search Report issued in International Patent Application No. PCT/JP2015/053804.

*Primary Examiner* — Omkar A Deodhar
*Assistant Examiner* — Eric M Thomas
(74) *Attorney, Agent, or Firm* — Oliff PLC

(57) ABSTRACT

An image generation system includes a processor including hardware, the processor being configured to implement an object space setting process, an image generation process generating a projection image, a process receiving a captured image from an imaging section, and a hit determination process calculating a screen spotlight position based on a position of a spotlight within the captured image, calculates a direction from a set position toward the screen spotlight position to be an emission direction of an emitting element, and determines whether or not an object among the plurality of objects disposed in the object space has been hit based on the calculated emission direction, the screen spotlight position being a position of the spotlight on a projection screen, the spotlight being formed by light emitted from the
(Continued)

emitting element, and the set position being set to be a representative position of the emitting element or a player.

14 Claims, 22 Drawing Sheets

(51) Int. Cl.
*A63F 13/837* (2014.01)
*A63F 13/219* (2014.01)
*A63F 13/213* (2014.01)
*A63F 13/426* (2014.01)
*G03B 21/10* (2006.01)
*H04N 5/74* (2006.01)
*G03B 17/54* (2006.01)
*G09G 5/00* (2006.01)
*G09G 5/36* (2006.01)
*G09G 5/38* (2006.01)
*G03B 21/14* (2006.01)
*G09G 5/377* (2006.01)
*A63F 13/843* (2014.01)
*A63F 13/25* (2014.01)
*H04N 9/31* (2006.01)

(52) U.S. Cl.
CPC ............ *A63F 13/25* (2014.09); *A63F 13/426* (2014.09); *A63F 13/837* (2014.09); *A63F 13/843* (2014.09); *G03B 17/54* (2013.01); *G03B 21/10* (2013.01); *G03B 21/14* (2013.01); *G09G 5/00* (2013.01); *G09G 5/36* (2013.01); *G09G 5/377* (2013.01); *G09G 5/38* (2013.01); *H04N 5/74* (2013.01); *H04N 9/3185* (2013.01)

(56) References Cited

U.S. PATENT DOCUMENTS

| | | | |
|---|---|---|---|
| 2008/0064500 | A1 | 3/2008 | Satsukawa et al. |
| 2008/0070686 | A1 | 3/2008 | Satsukawa et al. |
| 2012/0058823 | A1* | 3/2012 | Minato ............ G06T 19/00 463/32 |
| 2013/0005417 | A1* | 1/2013 | Schmidt ............ A63F 13/213 463/5 |
| 2013/0303281 | A1* | 11/2013 | Argiro ............ A63F 13/02 463/31 |
| 2014/0274379 | A1* | 9/2014 | Justice ............ A63F 13/12 463/31 |

FOREIGN PATENT DOCUMENTS

| | | |
|---|---|---|
| JP | 2001-218982 A | 8/2001 |
| JP | 2002-18128 A | 1/2002 |
| JP | 2003-085586 A | 3/2003 |
| JP | 2008-73184 A | 4/2008 |

* cited by examiner

IMAGE GENERATION SYSTEM, IMAGE GENERATION METHOD, AND INFORMATION STORAGE MEDIUM

CROSS REFERENCE TO RELATED APPLICATION

This application is a continuation of International Patent Application No. PCT/JP2015/053804, having an international filing date of Feb. 12, 2015, which designated the United States, the entirety of which is incorporated herein by reference. Japanese Patent Application No. 2014-025962 filed on Feb. 13, 2014 is also incorporated herein by reference in its entirety.

BACKGROUND

The present invention relates to an image generation system, an image generation method, an information storage medium, and the like.

A system is known that generates a projection image that is projected onto a curved screen (i.e., a screen having a dome-like shape) using a projection device (projector). For example, JP-A-2003-85586 discloses technology that projects a projection image with a small amount of distortion onto a curved screen.

A game system is also known that performs a hit determination process applied to a shooting game by detecting the position of a spotlight formed by light emitted from an emitting element. For example, JP-A-2001-4327 discloses technology that relates to such a game system.

However, a method that causes an image generation system that generates a projection image that is projected onto a curved screen, to detect the position of a spotlight formed by light emitted from an emitting element, and implement an appropriate hit determination process on the emission direction of the emitting element and an object, has not yet been proposed.

SUMMARY

According to one aspect of the invention, there is provided an image generation system comprising:
a processor comprising hardware,
the processor being configured to implement:
an object space setting process that sets an object space;
an image generation process that generates a projection image based on information about a plurality of objects that are disposed in the object space;
a process that receives a captured image from an imaging section that captures a projection area, the projection area being an area onto which the projection image is projected; and
a hit determination process that calculates a screen spotlight position based on a position of a spotlight within the captured image, calculates a direction from a set position toward the screen spotlight position to be an emission direction of an emitting element, and determines whether or not an object among the plurality of objects disposed in the object space has been hit based on the calculated emission direction, the screen spotlight position being a position of the spotlight on a projection screen, the spotlight being formed by light emitted from the emitting element, and the set position being set to be a representative position of the emitting element or a player.

According to another aspect of the invention, there is provided an image generation system comprising:

a processor comprising hardware;
a projection device that projects a projection image;
an imaging section that captures a projection area onto which the projection image is projected; and
an emitting element that emits light,
wherein the processor is configured to implement:
an object space setting process that sets an object space;
an image generation process that generates the projection image based on information about a plurality of objects that are disposed in the object space; and
a hit determination process that calculates an emission direction of the emitting element based on a captured image that has been captured by the imaging section, and determines whether or not an object among the plurality of objects disposed in the object space has been hit based on the calculated emission direction, and
wherein the imaging section comprises an image sensor and a fish-eye lens.

According to another aspect of the invention, there is provided an image generation method comprising:
performing an object space setting process that sets an object space;
performing an image generation process that generates a projection image based on information about a plurality of objects that are disposed in the object space;
performing a process that receives a captured image from an imaging section that captures a projection area, the projection area being an area onto which the projection image is projected; and
performing a hit determination process that calculates a screen spotlight position based on a position of a spotlight within the captured image, calculates a direction from a set position toward the screen spotlight position to be an emission direction of an emitting element, and determines whether or not an object among the plurality of objects disposed in the object space has been hit based on the calculated emission direction, the screen spotlight position being a position of the spotlight on a projection screen, the spotlight being formed by light emitted from the emitting element, and the set position being set to be a representative position of the emitting element or a player.

DESCRIPTION OF EXEMPLARY EMBODIMENTS

Figure 1:
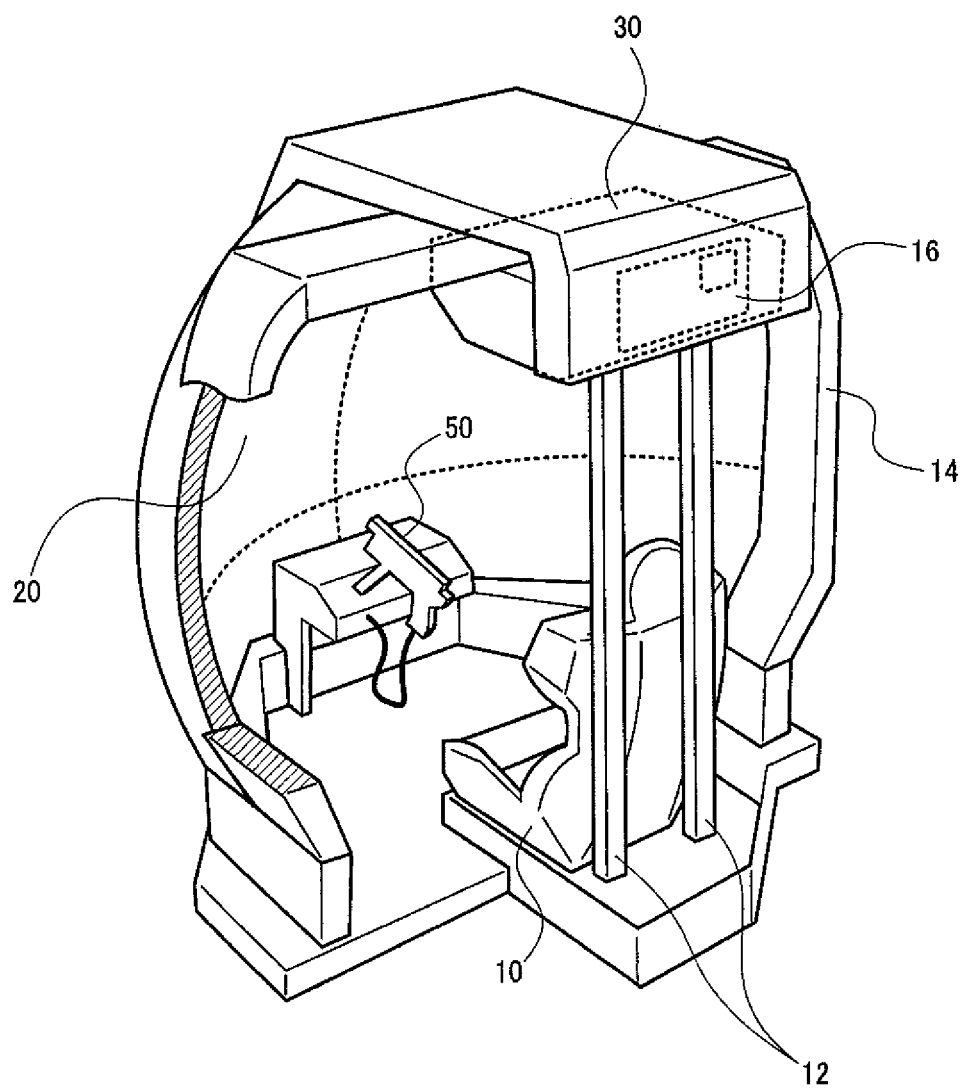
FIG. 1 illustrates an example of a game system to which an image generation system according to one embodiment of the invention is applied.

Several aspects of the invention may provide an image generation system, an image generation method, an information storage medium, and the like that can implement an appropriate hit determination process while generating a projection image (projection target image).

According to one embodiment of the invention, there is provided an image generation system comprising:

a processor comprising hardware, the processor being configured to implement:

an object space setting process that sets an object space;

an image generation process that generates a projection image based on information about a plurality of objects that are disposed in the object space;

a process that receives a captured image from an imaging section that captures a projection area, the projection area being an area onto which the projection image is projected; and a hit determination process that calculates a screen spotlight position based on a position of a spotlight within the captured image, calculates a direction from a set position toward the screen spotlight position to be an emission direction of an emitting element, and determines whether or not an object among the plurality of objects disposed in the object space has been hit based on the calculated emission direction, the screen spotlight position being a position of the spotlight on a projection screen, the spotlight being formed by light emitted from the emitting element, and the set position being set to be a representative position of the emitting element or a player.

According to one embodiment of the invention, the screen spotlight position (i.e., the position of the spotlight on the projection screen) is calculated based on the position of the spotlight within the captured image. The direction from the set position (that is set to be the representative position of the emitting element or the player) toward the screen spotlight position is calculated to be the emission direction, and whether or not the object disposed in the object space has been hit is determined based on the emission direction. According to this configuration, it is possible to implement an image generation system that can implement an appropriate hit determination process that reflects the shape of the projection screen while generating the projection image. Specifically, when the direction from the set position toward the screen spotlight position is set to be the emission direction, it is possible to calculate an appropriate emission direction that reflects the shape of the projection screen when the projection screen is not a screen that is configured by only a single plane, and implement the hit determination process based on the emission direction.

In the image generation system, wherein the projection screen may be a screen that is configured by one curved surface or a plurality of surfaces, and the processor may be configured to implement the image generation process that performs a distortion correction process based on shape information about the projection screen to generate the projection image, and implement the hit determination process that calculates the screen spotlight position based on the shape information about the projection screen.

It is possible to generate an appropriate projection image that reflects the shape of the projection screen that is configured by one curved surface or a plurality of surfaces by performing the distortion correction process based on the shape information about the projection screen. It is possible to calculate the screen spotlight position that reflects the shape of the projection screen that is configured by one curved surface or a plurality of surfaces by calculating the screen spotlight position based on the shape information about the projection screen, and implement an appropriate hit determination process that reflects the shape of the projection screen.

In the image generation system, wherein the processor may be configured to implement the hit determination process that calculates a direction vector of the spotlight viewed from the imaging section based on the position of the spotlight within the captured image, and calculates a position of an intersection of a straight line that extends along the direction vector with the projection screen, to be the screen spotlight position.

According to this configuration, the direction vector of the spotlight that corresponds to the position of the spotlight within the captured image is calculated, and the screen spotlight position can be calculated by calculating the position of the intersection of a straight line that extends along the direction vector with the projection screen. This makes it possible to calculate the screen spotlight position that reflects information about the optical system of the imaging section, for example.

In the image generation system, wherein the processor may be configured to implement the image generation process that determines a color of a pixel on a drawing buffer using a straight line as a line of sight of a virtual camera, the straight line connecting a position of an intersection and a representative viewpoint position, the intersection being an intersection of a light ray with the projection screen, the light ray being emitted through an optical system of the projection device corresponding to the pixel on the drawing buffer.

According to this configuration, it is possible to generate the projection image by performing the per-pixel distortion correction process.

In the image generation system, wherein the processor may be configured to implement the image generation process that calculates a vertex position of a drawing object on a drawing buffer based on a position of an intersection of a straight line with the projection screen, and draws the drawing object on the drawing buffer based on the vertex position, the drawing object corresponding to the object, and the straight line connecting the vertex position of the object in the object space and a representative viewpoint position.

According to this configuration, it is possible to generate the projection image by performing the per-vertex distortion correction process.

In the image generation system, wherein the processor may be configured to implement the object space setting process that calculates a position of a sight object that is disposed in the object space based on the emission direction, and disposes the sight object at the calculated position, the sight object representing a sight of the emitting element.

This makes it possible to dispose the sight object of the emitting element at the position calculated based on the emission direction, and generate an image of the sight object within the projection image.

In the image generation system, wherein the processor may be configured to implement the object space setting process that disposes the sight object on a straight line that extends along the emission direction.

This makes it possible to display the sight object that moves within the projection image in synchronization with a change in the emission direction of the emitting element.

In the image generation system, wherein the processor may be configured to implement the image generation process that generates the projection image in which a detection adjustment object for adjusting detection of the spotlight is displayed within an imaging range of the imaging section.

According to this configuration, it is possible to implement an appropriate spotlight position detection adjustment process that utilizes the detection adjustment object even when the installation position and the installation direction of the imaging section vary, for example.

In the image generation system, wherein the processor may be configured to implement the object space setting process that disposes the detection adjustment object in the object space so that the detection adjustment object is displayed within the imaging range of the imaging section that is situated within a projection area onto which the projection image is projected.

This makes it possible to appropriately display the detection adjustment object that implements the spotlight position detection adjustment process within the projection image.

In the image generation system, wherein the processor may be configured to implement an imaging range determination process that determines an imaging range of the imaging section based on a second captured image obtained by capturing the projection image, or historical information about a detection position of the spotlight.

According to this configuration, it is possible to determine the imaging range of the imaging section, and prevent a situation in which a problem occurs during the spotlight detection process based on the captured image that has been captured by the imaging section, for example.

The image generation system may further comprise:
the imaging section,
wherein the imaging section may comprise an image sensor and a fish-eye lens.

It is possible to implement the spotlight position detection process over a wide range of the projection area (onto which the projection image is projected) by providing the fish-eye lens to the imaging section.

The image generation system may further comprise:
the projection device,
wherein the imaging section may be provided to the projection device.

According to this configuration, it is possible to easily cause the projection direction of the projection device and the imaging direction of the imaging section to coincide with each other, and improve the accuracy of the hit determination process, for example.

According to another embodiment of the invention, there is provided an image generation system comprising:
a processor comprising hardware;
a projection device that projects a projection image;
an imaging section that captures a projection area onto which the projection image is projected; and
an emitting element that emits light,
wherein the processor is configured to implement:
an object space setting process that sets an object space;
an image generation process that generates the projection image based on information about a plurality of objects that are disposed in the object space; and
a hit determination process that calculates an emission direction of the emitting element based on a captured image that has been captured by the imaging section, and determines whether or not an object among the plurality of objects disposed in the object space has been hit based on the calculated emission direction, and
wherein the imaging section comprises an image sensor and a fish-eye lens.

According to another embodiment of the invention, there is provided an image generation method comprising:
performing an object space setting process that sets an object space;
performing an image generation process that generates a projection image based on information about a plurality of objects that are disposed in the object space;
performing a process that receives a captured image from an imaging section that captures a projection area, the projection area being an area onto which the projection image is projected; and
performing a hit determination process that calculates a screen spotlight position based on a position of a spotlight within the captured image, calculates a direction from a set position toward the screen spotlight position to be an emission direction of an emitting element, and determines whether or not an object among the plurality of objects disposed in the object space has been hit based on the calculated emission direction, the screen spotlight position being a position of the spotlight on a projection screen, the spotlight being formed by light emitted from the emitting element, and the set position being set to be a representative position of the emitting element or a player.

According to another embodiment of the invention, there is provided a computer-readable information storage medium storing a program that causes a computer to execute the above image generation method.

The exemplary embodiments of the invention are described below. Note that the following exemplary embodiments do not in any way limit the scope of the invention laid out in the claims. Note also that all of the elements described below in connection with the exemplary embodiments should not necessarily be taken as essential elements of the invention.

1. Configuration

Figure 2:
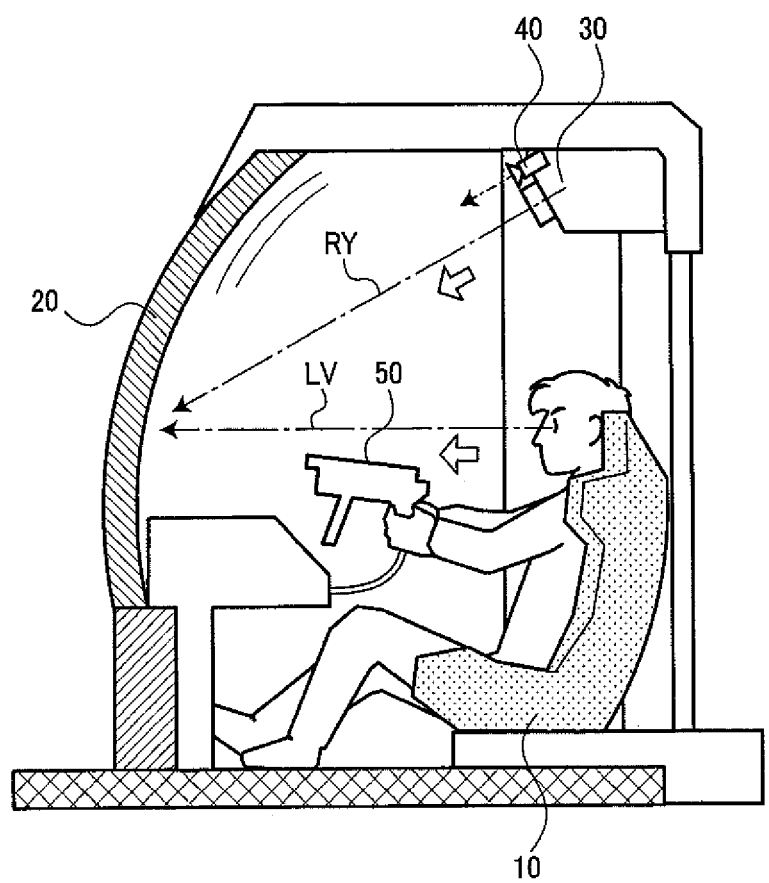
FIG. 2 is a vertical cross-sectional view illustrating a game system to which an image generation system according to one embodiment of the invention is applied.

FIG. 1 illustrates a configuration example of a game system to which an image generation system according to one embodiment of the invention is applied. FIG. 2 is a vertical cross-sectional view illustrating the game system.

The game system illustrated in FIGS. 1 and 2 is an arcade game system that is installed in an amusement center, and allows the player to play a shooting game. The game system includes a player's seat 10, a control board 16, a screen 20 having a curved shape onto which a projection image (i.e., game image) is projected, a projection device 30 that projects the projection image (picture) onto the screen 20, an imaging section 40 that detects a spotlight, an emitting element 50 (gun-type controller) that imitates a gun, and a speaker (not illustrated in the drawings) that outputs a game sound.

The player's seat 10 is provided in a state in which the direction and the height thereof are adjusted so that the center area of the screen 20 is situated in a presumed viewing direction of the player who sits on the player's seat 10. In one embodiment of the invention, the term "presumed viewing direction" refers to the front direction of the player who sits on the player's seat 10. The screen 20 is formed to be convex in the front direction (presumed viewing direction) of the player who sits on the player's seat 10.

The control board 16 includes a processor (e.g., CPU, GPU, or DSP), an ASIC, and a memory (e.g., VRAM, RAM, or ROM). The control board 16 performs various processes for implementing the shooting game based on a program and data stored in the memory, and an operation signal that represents the operation performed by the player on the emitting element 50 and the like, for example.

The projection device 30 (projector) is supported by posts 12 (that are provided behind the player's seat 10) and a housing frame 14, and disposed at a position above the player's seat 10 at which the projection device 30 does not interfere with the player who sits on the player's seat 10 so that the projection center direction of the projection device 30 intersects the center area of the screen 20. Specifically, the projection device 30 is disposed so that the projection center direction intersects the position of the intersection of the presumed viewing direction of the player with the screen 20. A wide-angle lens (e.g., a fish-eye lens (i.e., a super-wide-angle lens having an angle of view of more than 180°)) is provided to the projection device 30 as a projection lens. The projection image is projected onto the entire projection area of the screen 20 through the wide-angle lens.

The imaging section 40 that captures the projection area (onto which the projection image is projected) is provided to the projection device 30. For example, the imaging direction of the imaging section 40 is set to the projection direction (in which the projection image is projected). The position of a spotlight formed on the screen 20 due to light emitted from the emitting element 50 is detected using the captured image that has been captured by the imaging section 40. The emission direction of the light emitted from the emitting element 50 is determined based on the position of the spotlight detected as described above, and a hit determination process is performed on an enemy object that appears within the game image.

The emitting element 50 is a gun-type controller that is formed to imitate a gun. An infrared-emitting device (element) is provided to the emitting element 50. A spotlight is formed on the screen 20 when infrared light is applied to the screen 20. An infrared filter (IR filter) that blocks visible light, and allows infrared light to pass through is provided to the imaging section 40, and the position of a spotlight formed by infrared light can be detected based on the captured image that has been captured by the imaging section 40.

The player sits on the player's seat 10, and enjoys the game by shooting an enemy that appears within the game image using the emitting element 50 that imitates a gun while observing the game image displayed on the screen 20, and listening to the game sound output from the speaker.

The shooting game according to one embodiment of the invention is designed so that an object (e.g., background object) is disposed in an object space (virtual three-dimensional space) to form a game space. An enemy object (i.e. shooting target) and the like are also disposed in the object space, and a virtual camera is disposed at the viewpoint position of the player. The projection device 30 projects (displays) an image of the object space viewed from the virtual camera onto (on) the screen 20 as the game image.

Figure 3:
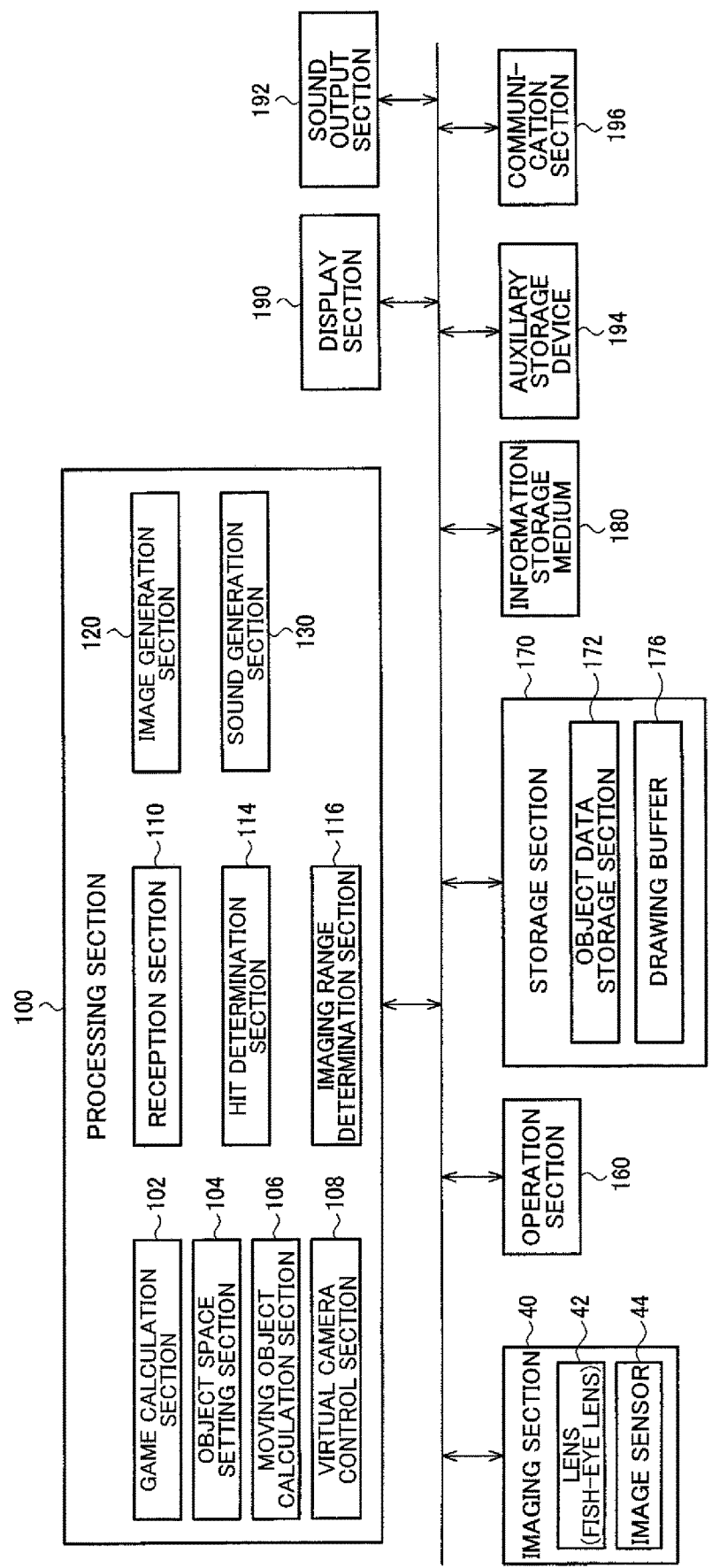
FIG. 3 illustrates a configuration example of an image generation system according to one embodiment of the invention.

FIG. 3 illustrates an example of a block diagram of the image generation system according to one embodiment of the invention. Note that the configuration of the image generation system according to one embodiment of the invention is not limited to the configuration illustrated in FIG. 3. Various modifications may be made, such as omitting some of the elements (sections) illustrated in FIG. 3, or providing (adding) an additional element.

The imaging section 40 (camera) includes an optical system that includes a lens 42 and the like, and an image sensor 44. The lens 42 forms an image on the image sensor 44, for example. The lens 42 is a wide-angle lens (e.g., fish-eye lens) for capturing the entire screen 20. The image sensor 44 is implemented by a CCD sensor or a CMOS sensor, for example. The imaging section 40 also includes an infrared filter (see above) and the like.

An operation section 160 allows the player to input operation data. When the image generation system is applied to the game system illustrated in FIGS. 1 and 2, the operation section 160 may be implemented by the emitting element 50 (i.e., gun-type controller), an operation button (not illustrated in the drawings), or the like.

A storage section 170 serves as a work area for a processing section 100, a communication section 196, and the like. The function of the storage section 170 may be implemented by a RAM (DRAM or VRAM) or the like. A game program and game data (that is necessary when executing the game program) are stored in the storage section 170.

An information storage medium 180 (computer-readable medium) stores a program, data, and the like. The function of the information storage medium 180 may be implemented by an optical disk (CD or DVD), a hard disk drive (HDD), a memory (e.g., ROM), or the like. The processing section 100 performs various processes according to one embodiment of the invention based on a program (data) stored in the information storage medium 180. Specifically, a program that causes a computer (i.e., a device that includes an operation section, a processing section, a storage section, and an output section) to function as each section according to one embodiment of the invention (i.e., a program that causes a computer to execute the process of each section) is stored in the information storage medium 180.

A display section 190 displays an image generated according to one embodiment of the invention. When the image generation system is applied to the game system illustrated in FIGS. 1 and 2, the display section 190 may be implemented by an LCD provided to a liquid crystal projector, a DMD provided to a DLP projector, or the like. A sound output section 192 outputs a sound generated according to one embodiment of the invention. The function of the sound output section 192 may be implemented by a speaker, a headphone, or the like.

An auxiliary storage device 194 (auxiliary memory or secondary memory) is a storage device that is used to supplement the capacity of the storage section 170. The auxiliary storage device 194 may be implemented by a memory card such as an SD memory card or a multimedia card, or the like.

The communication section 196 communicates with the outside (e.g., another image generation system, a server, or a host device) through a cable or wireless network. The function of the communication section 196 may be implemented by hardware such as a communication ASIC or a communication processor, or communication firmware.

The processing section 100 (processor) performs a game process, an image generation process, a sound generation process, and the like based on operation data output from the operation section 160, a program, and the like. The processing section 100 performs various processes using the storage section 170 as a work area.

Each process (each function) according to one embodiment of the invention that is performed (implemented) by each section of the processing section 100 may be implemented by a processor (i.e., a processor including hardware). For example, each process according to one embodiment of the invention may be implemented by a processor that operates based on information (e.g., program), and a memory that stores information (e.g., program). The processor may implement the function of each section by individual hardware, or may implement the function of each section by integrated hardware, for example. The processor may be a central processing unit (CPU), for example. Note that the processor is not limited to a CPU. Various other processors such as a graphics processing unit (GPU) or a digital signal processor (DSP) may also be used. The processor may be a hardware circuit that includes an ASIC. The memory (storage section 170) may be a semiconductor memory (e.g., SRAM or DRAM), or may be a register. The memory may be a magnetic storage device such as a hard disk drive (HDD), or may be an optical storage device such as an optical disk device. For example, the memory stores a computer-readable instruction, and the process (each function) of each section of the processing section 100 is implemented by causing the processor to execute the instruction. The instruction may be an instruction set that is included in a program, or may be an instruction that causes the hardware circuit included in the processor to operate.

The processing section 100 includes a game calculation section 102, an object space setting section 104, a moving object calculation section 106, a virtual camera control section 108, a reception section 110, a hit determination section 114, an imaging range determination section 116, an image generation section 120, and a sound generation section 130. Note that various modifications may be made, such as omitting some of these elements (sections), or providing (adding) an additional element.

The game calculation section 102 performs a game calculation process. The game calculation process includes a process that starts the game when game start conditions have been satisfied, a process that proceeds with the game, a process that calculates the game result, a process that terminates the game when game termination conditions have been satisfied, and the like.

The object space setting section 104 performs a process that sets the object space in which a plurality of objects are disposed. For example, the object space setting section 104 performs a process that disposes an object (i.e., an object formed by a primitive surface such as a polygon, a free-form surface, or a subdivision surface) that represents a display object such as a moving object (e.g., human, animal, robot, car, airplane, or ship), a map (geographical feature), a building, a course (road), a tree, a wall, or a water surface in the object space. Specifically, the object space setting section 104 determines the position and the rotation angle (synonymous with orientation or direction) of the object in a world coordinate system, and disposes the object at the determined position (X, Y, Z) and the determined rotation angle (rotation angles around X, Y, and Z-axes). More specifically, an object data storage section 172 included in the storage section 170 stores an object number, and object data that represents the position, the rotation angle, the moving speed, the moving direction, and the like of the object (part object), and is linked to the object number. The object space setting section 104 performs a process that updates the object data every frame, for example.

The moving object calculation section 106 performs a control process that moves the moving object (e.g., human, animal, car, or airplane). The moving object calculation section 106 also performs a control process that causes the moving object to make a motion. Specifically, the moving object calculation section 106 performs a control process that causes the moving object (object or model object) to move or make a motion (animation) in the object space based on the operation data input by the player using the operation section 160, a program (movement/motion algorithm), data (motion data), and the like. More specifically, the moving object calculation section 106 performs a simulation process that sequentially calculates movement information (position, rotational angle, speed, or acceleration) and motion information (position or rotational angle of the part object) about the moving object every frame (e.g., 1/60th of a second). Note that the term "frame" used herein refers to a time unit used when performing the moving object movement/motion process (simulation process) and the image generation process.

The virtual camera control section 108 performs a process that controls the virtual camera (viewpoint or reference virtual camera) for generating an image viewed from a given (arbitrary) viewpoint within the object space. Specifically, the virtual camera control section 108 performs a process that controls the position (X, Y, Z) or the rotation angle (rotation angles around X, Y, and Z-axes) of the virtual camera (i.e., a process that controls the viewpoint position, the line-of-sight direction, or the angle of view).

For example, when photographing the moving object from behind using the virtual camera, the virtual camera control section 108 controls the position (viewpoint position) and the direction (line-of-sight direction) of the virtual camera so that the virtual camera follows a change in the position or the direction of the moving object. In this case, the virtual camera control section 108 controls the virtual camera based on information about the position, the direction, or the speed of the moving object obtained by the moving object calculation section 106. Alternatively, the virtual camera control section 108 may rotate the virtual camera by a predetermined rotation angle, or may move the virtual camera along a predetermined path. In this case, the virtual camera control section 108 controls the virtual camera based on virtual camera data that represents the position (moving path) or the direction of the virtual camera.

The sound generation section 130 performs a sound process based on the results of various processes performed by the processing section 100 to generate a game sound (e.g., background music (BGM), effect sound, or voice), and outputs the generated game sound to the sound output section 192.

As illustrated in FIG. 3, the image generation system according to one embodiment of the invention includes the object space setting section 104, the reception section 110, the hit determination section 114, and the image generation section 120. The image generation system (game system) according to one embodiment of the invention may include the imaging section 40, the projection device 30, and the emitting element 50 (see FIGS. 1 and 2).

The object space setting section 104 performs a process that sets the object space (see above). The object space is a three-dimensional game space.

The image generation section 120 generates the projection image. More specifically, the image generation section 120 generates the projection image (i.e., the projection image generated by a projection mapping process) based on information about a plurality of objects (e.g., enemy object and background object) that are disposed in the object space. The projection image is an image that is projected by the projection device 30 onto the screen 20 having a curved shape (i.e., a screen having a dome-like shape). The projection image is displayed on the display section 190 that is implemented by an LCD provided to a liquid crystal projector, or a DMD provided to a DLP projector, and is projected onto the screen 20 through the optical system (e.g., wide-angle lens) of the projection device 30.

The reception section 110 receives the captured image from the imaging section 40 that captures the projection area (screen area) onto which the projection image is projected (i.e., receives the captured image that has been captured by the imaging section 40). For example, the imaging direction (capture direction) of the imaging section 40 is set to be (approximately) identical to the projection direction in which the projection image is projected (i.e., the projection direction of the projection device). More specifically, the imaging section 40 is provided so that the imaging direction is (approximately) parallel to the projection direction, for example. When the imaging section 40 has captured an image within the projection area of the screen 20, the reception section 110 that functions as an image interface receives data that represents the captured image.

The hit determination section 114 performs the hit determination process that determines whether or not light emitted from the emitting element 50 has hit an object. Specifically, the hit determination section 114 performs the hit determination process that determines whether or not a bullet represented by light emitted from the emitting element 50 has hit an object on the assumption that a bullet has been fired in the emission direction of the emitting element 50 (i.e., the direction in which light has been emitted from the emitting element 50).

More specifically, the hit determination section 114 calculates the position (i.e., the position in the coordinate system of the image sensor) of a spotlight formed by light (e.g., infrared light) emitted from the emitting element 50 within the captured image. For example, the hit determination section 114 calculates the position of the spotlight (e.g., infrared spotlight) within the captured image by performing image processing or the like on the captured image that has been captured by (output from) the imaging section 40. The hit determination section 114 calculates a screen spotlight position (i.e., the position of the spotlight on a projection screen) based on the position of the spotlight within the captured image. For example, the position of the spotlight within the captured image and the position of the spotlight on the projection screen have a one-to-one relationship (i.e., can be linked to each other on a one-to-one basis). The screen spotlight position is the position of the spotlight on the projection screen that has a one-to-one relationship with the position of the spotlight within the captured image (i.e., that can be linked to the position of the spotlight within the captured image on a one-to-one basis).

The hit determination section 114 calculates the direction from a set position (preset position) toward the screen spotlight position to be the emission direction of the emitting element 50, the set position being set to be a representative position of the emitting element 50 or the player. Specifically, the set position is set to be the representative position that is considered to be the position of the emitting element 50 (or the position of the player), and the direction of a straight line that connects the set position and the screen spotlight position is calculated to be the emission direction. The emission direction does not necessarily coincide with the actual emission direction of the emitting element 50. Specifically, the direction of the straight line that connects the set position and the position of the intersection (see above) is virtually set to be the emission direction in order to implement the hit determination process.

The hit determination section 114 performs the hit determination process (that determines whether or not an object disposed in the object space has been hit) based on the emission direction. Specifically, the hit determination section 114 determines whether or not the target object (e.g., enemy object) has been hit. For example, the hit determination section 114 performs the hit determination process that determines whether or not light (bullet or shot) emitted from the emitting element 50 has hit the object by setting a straight line (light ray) that extends along the calculated emission direction, and determining whether or not the straight line intersects the object.

When the projection screen is a screen that is configured by one curved surface or a plurality of surfaces, the image generation section 120 performs a distortion correction process based on shape information about the projection screen to generate the projection image. The shape information about the projection screen is information that represents the shape of the projection screen using a mathematical formula (e.g., ellipsoid formula) or the like, for example. The image generation section 120 performs the distortion correction process that reflects the shape of the projection screen that is configured by one curved surface or a plurality of surfaces to generate the projection image.

The hit determination section 114 calculates the screen spotlight position based on the shape information about the projection screen. For example, the hit determination section 114 calculates the screen spotlight position based on information that represents the shape of the projection screen using a mathematical formula or the like. For example, when the position of the intersection of a straight line that extends along a direction vector with the projection screen is calculated to be the screen spotlight position (as described later), the screen spotlight position may be calculated based on a mathematical formula that represents the straight line that extends along the direction vector, and a mathematical formula that represents the shape of the projection screen.

The hit determination section 114 calculates the direction vector of the spotlight viewed from the imaging section 40 based on the position of the spotlight within the captured image. For example, the hit determination section 114 calculates the direction vector that represents the direction of the spotlight displayed on the screen 20 using the camera coordinate system of the imaging section 40. The hit determination section 114 calculates the position of the intersection of a straight line that extends along the direction vector (i.e., a straight line that extends along the direction vector from the representative position of the imaging section 40) with the projection screen to be the screen spotlight position. The hit determination section 114 then calculates the direction of a straight line that connects a preset value that is considered to be the position of the emitting element 50 (or the position of the player) and the screen spotlight position (that is the position of the intersection of the straight line that extends along the direction vector with the projection screen) to be the emission direction, and performs the hit determination process.

The object space setting section 104 performs a process that disposes a sight object. For example, the object space setting section 104 calculates the position of the sight object (gun sight) (that represents the sight of the emitting element 50) that is disposed in the object space based on the emission direction (see above). The object space setting section 104 disposes the sight object at the calculated position. More specifically, the object space setting section 104 disposes the sight object on the straight line that extends along the emission direction. For example, the object space setting section 104 disposes the sight object (three-dimensional object) so as to intersect the straight line that extends along the emission direction.

The image generation section 120 generates the projection image in which a spotlight detection adjustment object (i.e., a detection adjustment object for adjusting the detection of a spotlight) is displayed. For example, the image generation section 120 generates the projection image in which the spotlight detection adjustment object (initial adjustment object) is displayed within the imaging range (imaging area) of the imaging section 40. More specifically, the object space setting section 104 disposes the detection adjustment object (three-dimensional object) in the object space so that the detection adjustment object is displayed within the imaging range of the imaging section 40 that is situated within the projection area (screen area) onto which the projection image is projected. It is possible to implement a spotlight position detection adjustment process (correction process) and the like by utilizing the detection adjustment object.

The imaging range determination section 116 performs a process that determines the imaging range of the imaging section 40. In one embodiment of the invention, the imaging range is narrower than the projection area (i.e., the display area of the projection image). For example, the imaging range is included within the projection area. The boundary and the like of the imaging range may vary due to variations in the installation position and the installation direction of the imaging section 40. The imaging range determination section 116 determines the boundary and the like of the imaging range.

In this case, the imaging range determination section 116 determines the imaging range of the imaging section 40 based on a second captured image obtained by capturing the projection image, or historical information about the detection position of the spotlight. The second captured image differs from the captured image that has been captured by the imaging section 40 in order to detect the spotlight. For example, when the captured image is a captured image obtained by capturing infrared light, the second captured image is a captured image obtained by capturing visible light. The second captured image may be captured using a second imaging section that differs from the imaging section 40, or may be captured by switching the filter (e.g., infrared filter) provided to the imaging section 40, for example. The historical information about the detection position of the spotlight is a history with respect to the detection position of the spotlight that has been obtained when the operator (e.g., player) has operated the emitting element 50. The historical information about the detection position of the spotlight may be the historical information about the detection position during the previous game play, or may be the historical information about the detection position during the game play performed by another player.

The image generation section 120 generates the projection image. The projection image generated by the image generation section 120 is projected onto the screen 20 through the projection device 30 illustrated in FIGS. 1 and 2. Therefore, the player can observe the image of the object space viewed from the virtual camera as a game image. The projection image is an image that has been generated by a projection mapping process, for example. The projection mapping process projects the projection image using the projection device 30 taking account of the state (e.g., shape) of the object (screen) onto which the projection image is projected, and the state (e.g., position and direction) of the projection device 30.

More specifically, the image generation section 120 determines the color of each pixel on a drawing buffer 176 using a straight line as the line of sight of the virtual camera, the straight line connecting the position of an intersection and a representative viewpoint position, the intersection being the intersection of a light ray with the projection screen, the light ray being emitted through the optical system (e.g., wide-angle lens) of the projection device 30 corresponding to the pixel (i.e., the pixel of the projection image) on the drawing buffer 176. For example, the image generation section 120 determines the color of the pixel from the information about the object space using the straight line as the line of sight of the virtual camera. Specifically, the image generation section 120 determines the color of the pixel corresponding to the position of the intersection of the straight line with the object disposed in the object space (i.e., the position of a point of the object that is initially reached by the straight line in the object space). This process can be implemented using a ray tracing method. However, since the drawing load is high when using a ray tracing method, it is difficult to implement the process in real time. It is more practical to implement the process using a method that stores the drawing results with respect to a plane screen (hereinafter referred to as "substitute plane") having a shape close to that of the curved screen in the form of a render texture. The color of the pixel is thus determined to generate the projection image. Note that the representative viewpoint position refers to a position that is considered to be the viewpoint position of the player (i.e., the position of the virtual camera).

Alternatively, the image generation section 120 calculates a straight line that connects the vertex position of the object in the object space and the representative viewpoint position, and calculates the position of the intersection of the straight line with the projection screen. The image generation section 120 calculates the vertex position of the drawing object (that corresponds to the object) on the drawing buffer 176 based on the position of the intersection thus calculated. The image generation section 120 draws the drawing object on the drawing buffer 176 based on the calculated vertex position to generate the projection image.

Note that the projection screen is a virtual screen for generating the projection image that is disposed (set) in the object space (i.e., virtual three-dimensional space) corresponding to the screen 20 illustrated in FIGS. 1 and 2, for example. The image generation section 120 performs a distortion correction process (also referred to as "projection mapping process") corresponding to the shape of the projection screen. The projection screen may be a screen that is configured by only one curved surface, or may be a screen that is configured by a plurality of surfaces (curved surface(s) and/or plane surface(s)).

The term "drawing object" used herein refers to a two-dimensional object that corresponds to the drawing target three-dimensional object. For example, the term "three-dimensional object" used herein refers to an object that is disposed in a three-dimensional space (object space). For example, the three-dimensional object has three-dimensional coordinate values (X, Y, and Z-coordinate values) as vertex coordinate values. On the other hand, the drawing object is an object that has two-dimensional coordinate values (X and Y-coordinate values) as vertex coordinate values. The drawing buffer 176 is a buffer (e.g., frame buffer or work buffer) that can store image information on a pixel basis, for example.

2. Method

The method according to one embodiment of the invention is described in detail below. Although an example in which the projection screen is a screen having a curved shape (i.e., a screen having a dome-like shape) is mainly described below, the projection screen is not limited thereto. Specifically, the term "projection screen" used herein refers to a screen other than a screen that is configured by only a single plane (plane surface) (i.e., plane screen). For example, the projection screen may be a screen that is configured by one curved surface or a plurality of surfaces (i.e., includes a plurality of plane surfaces, or includes a plurality of curved surfaces, or includes one or more plane surfaces and one or more curved surfaces). Specifically, the projection screen may be a screen that is configured by one curved surface, a screen that is configured by a plurality of plane surfaces, a screen that is configured by a curved surface and a plane surface, or the like.

2.1 Per-Pixel Distortion Correction Method

The projection image generation method is described below. For example, when the projection screen is a screen that is configured by one curved surface or a plurality of surfaces, a distortion correction process based on shape information about the projection screen is performed to generate the projection image. A specific example of the distortion correction method that is performed when generating the projection image is described below.

When an image is projected onto a screen having a dome-like shape (curved shape), the image may be significantly distorted when the projection device is situated away from the player (viewer). However, it is possible to present an undistorted image to the player by generating the projection image projected from the projection device (i.e., an image drawn on the drawing buffer of the projection device) taking account of such distortion.

In this case, since linear distortion (perspective distortion) occurs when the screen is configured by only a single plane (plane surface), it is possible to easily correct the distortion using only one projective transformation matrix.

However, since nonlinear distortion also occurs when the screen is not a screen that is configured by only a single plane (plane surface) (i.e., when the screen is configured by one curved surface or a plurality of surfaces), it is impossible to correct the distortion using a simple correction method that uses only one projective transformation matrix, and it is necessary to perform fine correction corresponding to each area (part) of the image.

Such a distortion correction process may be implemented by utilizing a method that corrects distortion corresponding to each pixel of the drawing buffer (i.e., per-pixel distortion correction method), or a method that corrects distortion corresponding to each vertex of a three-dimensional object (i.e., per-vertex distortion correction method). The per-pixel distortion correction method is described below.

Figure 4:
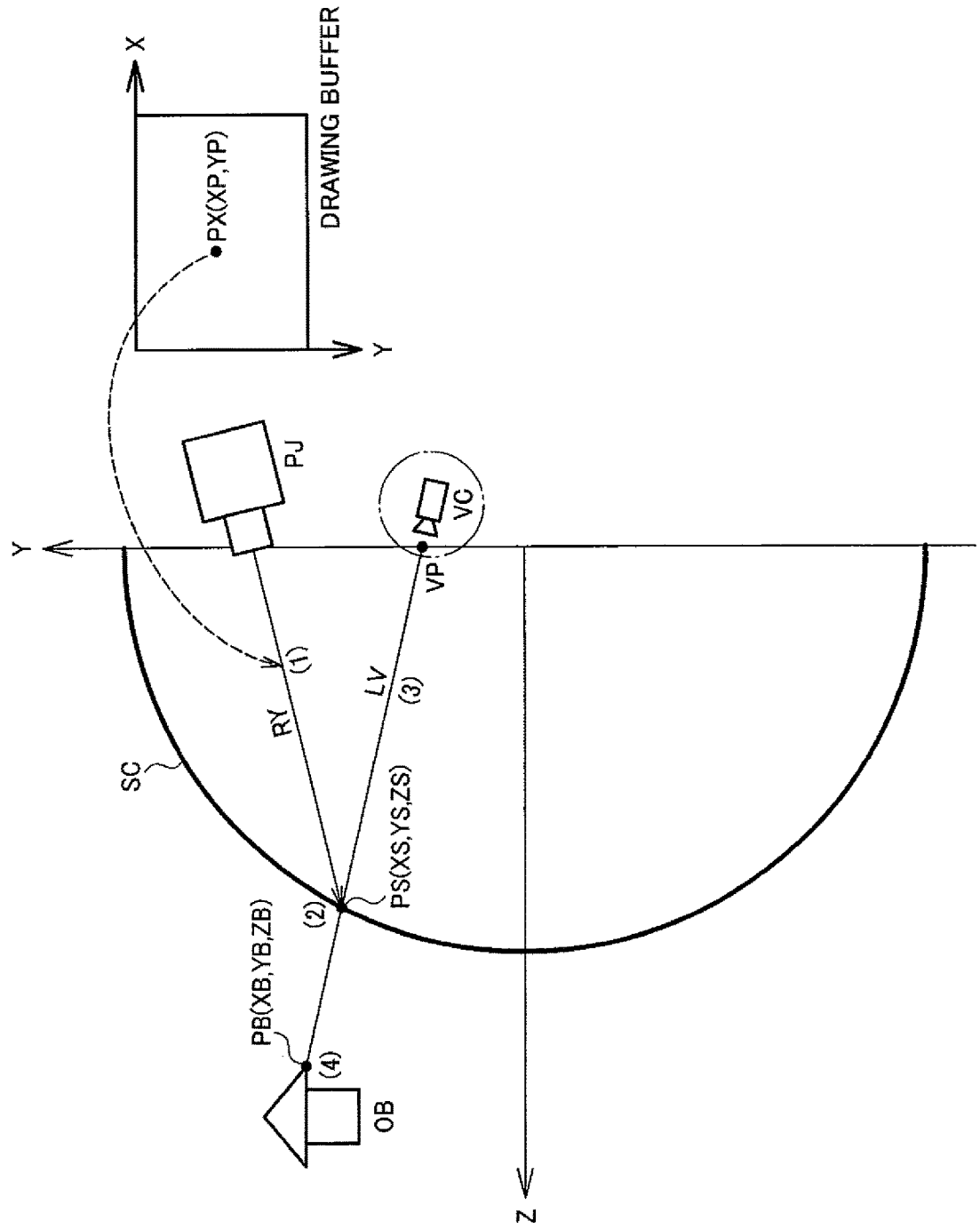
FIG. 4 is a view illustrating a method that corrects distortion corresponding to each pixel of a drawing buffer.

The per-pixel distortion correction method (i.e., a method that corrects distortion corresponding to each pixel of the drawing buffer) is implemented by sequentially performing the following steps (1), (2), (3), and (4) (see FIG. 4).

(1) A light ray RY that is projected through the lens of the projection device corresponding to a pixel PX(XP, YP) on the drawing buffer (frame buffer), is calculated.

(2) The position of the intersection PS(XS, YS, ZS) of the light ray RY with a screen SC is calculated. For example, when the screen SC is represented by a mathematical formula (e.g., ellipsoid formula), the intersection PS is calculated using a mathematical formula that represents the light ray (straight line) RY and a mathematical formula that represents the screen SC. The mathematical formula that represents the screen SC is used as the shape information about the screen SC.

(3) The color at the intersection PS(XS, YS, ZS) must be identical to the color when the player (viewer) observes the object space (virtual space). Therefore, a straight line LV that connects the intersection PS(XS, YS, ZS) and the position VP of a virtual camera VC that corresponds to a representative viewpoint of the player, is calculated.

(4) The color of the pixel of the projection image on the drawing buffer is determined from information about the object space using the straight line LV as the line of sight of the virtual camera VC. For example, the position of a point PB(XB, YB, ZB) of a three-dimensional object OB that is reached first in the object space is calculated, and the color of the pixel of the projection image on the drawing buffer is determined corresponding to the color of the point PB(XB, YB, ZB).

Alternatively, the step (4) may determine the color of the pixel of the projection image using the color at the intersection (render texture coordinates (U, V)) of a plane (render texture) (that is drawn in advance) with the straight line LV, instead of calculating the color at the intersection PB(XB, YB, ZB) of the straight line LV with the three-dimensional object OB. The render texture may be generated by selecting a plane that is situated as close to the plane of projection as possible (hereinafter referred to as "substitute plane") in advance, and drawing an image in the substitute plane using a normal drawing method (i.e., a drawing method that uses a plane as the plane of projection).

Figure 5:
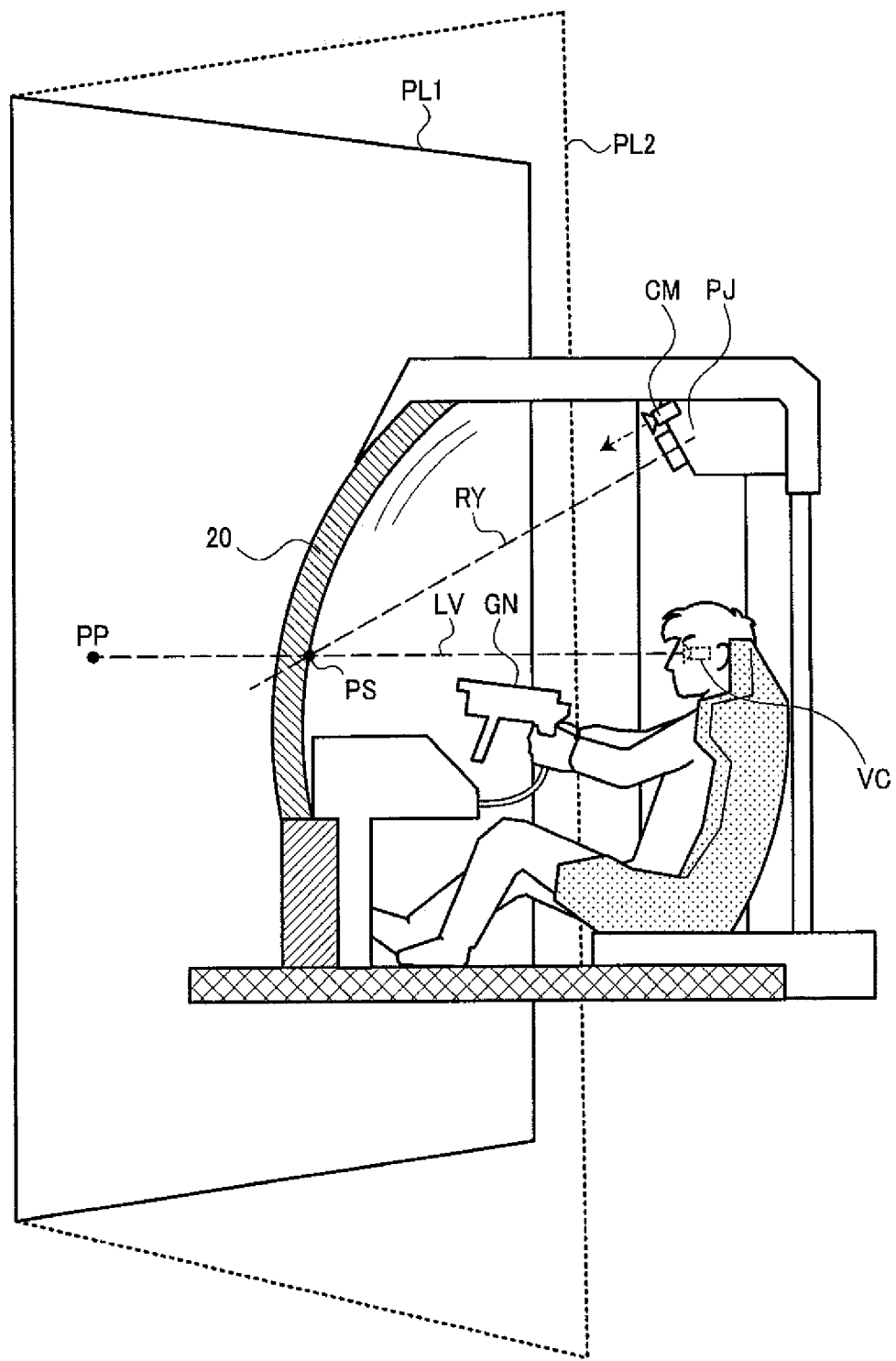
FIG. 5 is a view illustrating a method that uses a substitute plane for per-pixel distortion correction.

FIG. 5 illustrates an example of the substitute plane (see PL1 and PL2). A point PP is the intersection of the straight line LV with the substitute plane PL1 (PL2).

Figure 6:
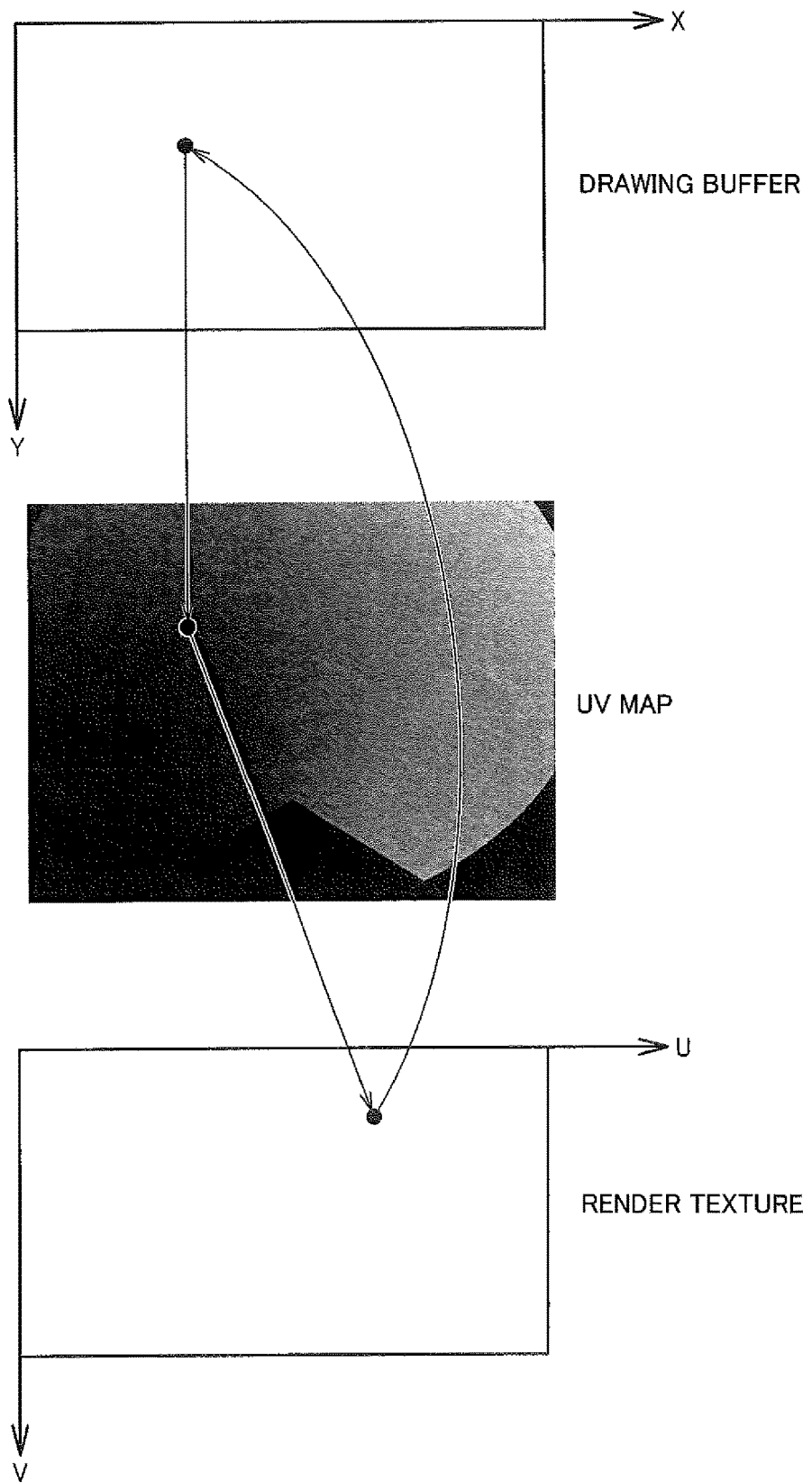
FIG. 6 is a view illustrating the relationship among a drawing buffer, a UV map, and a render texture when implementing a method that uses a substitute plane for per-pixel distortion correction.

It suffices that the reference position of the render texture be calculated only once as long as the position of the viewpoint or the projection device does not change. Examples of a typical method for storing data that represents the reference position of the render texture include a method that stores a texture that represents the position (U, V) of the render texture for which the pixel value (texel value) is referred to corresponding to each pixel of the drawing buffer. This texture is referred to as "UV map". FIG. 6 illustrates the relationship among the drawing buffer of the projection device, the UV map, and the render texture.

A large amount of resources are required to calculate and store each point (UV coordinates) of the render texture illustrated in FIG. 6 corresponding to each pixel of the drawing buffer. When it is difficult to provide such a large amount of resources, the corresponding point (XP, YP) on the drawing buffer and the corresponding point (U, V) on the render texture are calculated with respect to a representative vertex that is appropriately disposed on the screen SC, and a triangular polygon mesh that connects the corresponding points is generated. The coordinates (U, V) recorded as information corresponding to each vertex of the triangular polygon when drawing the triangular polygon are referred to, and the coordinates (U, V) interpolated from these coordinates are used for a point within the triangular polygon. This configuration makes it possible to significantly save resources.

2.2 Per-Vertex Distortion Correction Method

Figure 7:
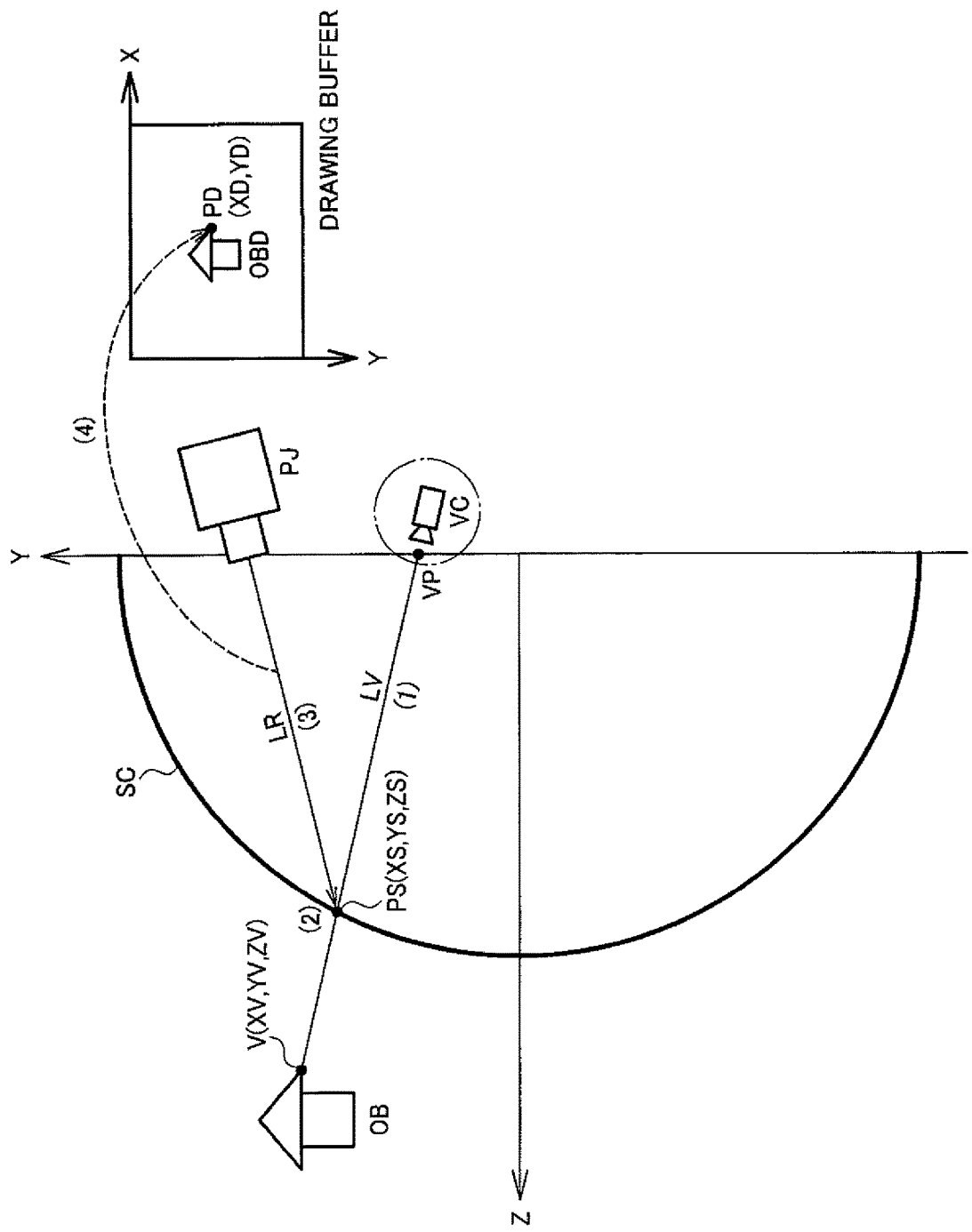
FIG. 7 is a view illustrating a method that corrects distortion corresponding to each vertex of an object.

The per-vertex distortion correction method (i.e., a method that corrects distortion corresponding to each vertex of a drawing object) is described below. The per-vertex distortion correction method transforms the vertex of the three-dimensional object in the object space into a point on the drawing buffer of the projection device. Specifically, the per-vertex distortion correction method is implemented by sequentially performing the following steps (1), (2), (3), and (4) (see FIG. 7). In other words, the per-vertex distortion correction method is implemented by performing the steps illustrated in FIG. 4 in reverse order.

(1) A straight line LV that connects the position of a vertex V(XV, YV, ZV) of a three-dimensional object OB in the object space and a position VP of a virtual camera VC that corresponds to a representative viewpoint of the player, is calculated.

(2) The position of the intersection PS(XS, YS, ZS) of the calculated straight line LV with a screen SC is calculated. For example, when the screen SC is represented by a mathematical formula (e.g., ellipsoid formula), the intersection PS is calculated using a mathematical formula that represents the straight line LV and a mathematical formula that represents the screen SC. The mathematical formula that represents the screen SC is used as the shape information about the screen SC.

(3) A straight line LR that connects the position of the intersection PS(XS, YS, ZS) and the position of a projection device PJ is calculated.

(4) The position of a point PD(XD, YD) on the drawing buffer that corresponds to the straight line LR is calculated. The point PD corresponds to the vertex of a drawing object OBD on the drawing buffer that corresponds to the three-dimensional object OB. Note that the point PD is calculated from the straight line LR using information about the optical system (e.g., lens characteristics and lens arrangement) of the projection device PJ.

A rasterization process that connects the vertices of the drawing object OBD, and colors the drawing object OBD is performed thereafter to generate the projection image on the drawing buffer.

In this case, it is desirable to use the method described below. Specifically, the vertex split process is performed on the three-dimensional object OB in the object space using the vertex split count set by the vertex split count setting section. The position of the intersection of the projection screen SC with a straight line that connects the vertex position of the three-dimensional object OB subjected to the vertex split process and the position of the virtual camera VC, is calculated. The vertex position (on the drawing buffer) of the drawing object OBD that corresponds to the three-dimensional object OB is calculated based on the position of the intersection calculated as described above. A process that draws the drawing object OBD on the drawing buffer based on the calculated vertex position of the drawing object OBD is performed to generate the projection image. This method makes it possible to suppress a situation in which a straight line is drawn on the drawing buffer corresponding to a straight line in the object space, and a distorted image is observed.

2.3 Hit Determination Process

Figure 8:
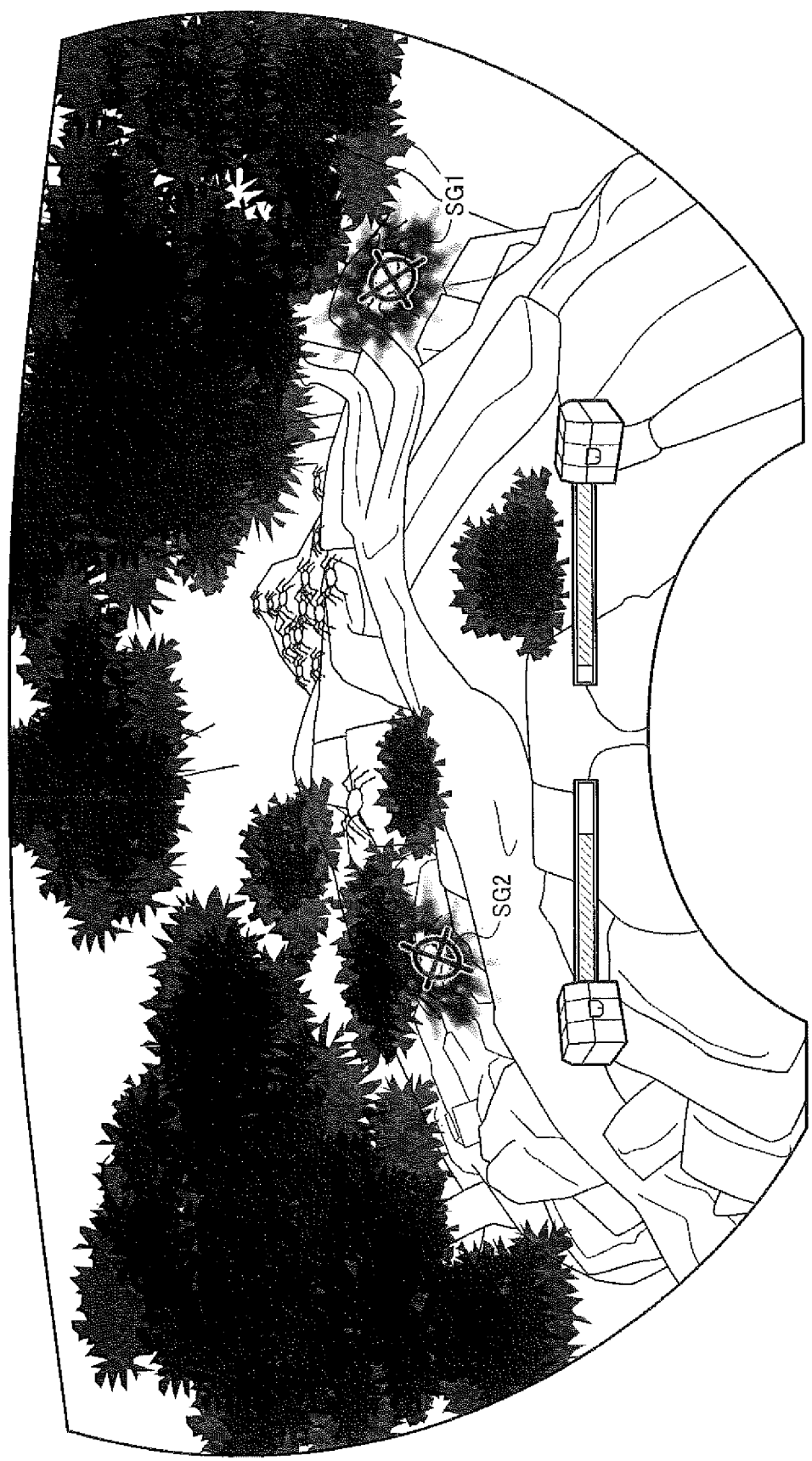
FIG. 8 illustrates an example of a projection image that is generated by an image generation system according to one embodiment of the invention.

FIG. 8 illustrates an example of the projection image generated by the image generation system according to one embodiment of the invention. In one embodiment of the invention, the projection image illustrated in FIG. 8 is generated on the drawing buffer, and the projection device 30 projects the generated projection image onto the screen 20. The projection image has been subjected to the per-pixel distortion correction process or the per-vertex distortion correction process (see above).

In one embodiment of the invention, the projection image illustrated in FIG. 8 is projected onto the screen 20 illustrated in FIGS. 1 and 2, and the player plays the shooting game in which the player shoots the target object (e.g., enemy object) while observing the projection image projected onto the screen 20. Specifically, the player holds the emitting element 50 that imitates a gun, and pulls a trigger (firing switch) provided to the emitting element 50 aiming at the target object to shoot the target object. In this case, the direction in which light (infrared light) is emitted from the emitting element 50 is set to be a direction in which a bullet travels in the game, and the hit determination process that determines whether or not the bullet (emitted light) has hit the target object is performed. When the bullet has hit the target object, a known hit effect generation process (e.g., a process that destroys the target object) is performed.

As illustrated in FIG. 8, images of objects (e.g., tree and rock) that form the game image are displayed within the projection image. Sight objects SG1 and SG2 are also displayed within the projection image. The sight objects SG1 and SG2 are objects that represent the sight of the emitting element 50 that imitates a gun. When the player has pulled the trigger provided to the emitting element 50 aiming at the sight object (sight object SG1 or SG2), a bullet (light ray) is fired (travels) in the direction toward the sight object. Note that FIG. 8 illustrates an example of the game image when two players play the game. In the example illustrated in FIG. 8, the sight object SG1 is the sight object for the first player, and the sight object SG2 is the sight object for the second player. The sight objects SG1 and SG2 are objects (three-dimensional objects) that are disposed in the object space. The positions of the sight objects SG1 and SG2 in the object space are calculated based on the emission direction of the emitting element 50, for example. Therefore, the images of the sight objects SG1 and SG2 have also been subjected to the per-pixel distortion correction process or the per-vertex distortion correction process (see above).

Figure 9B:
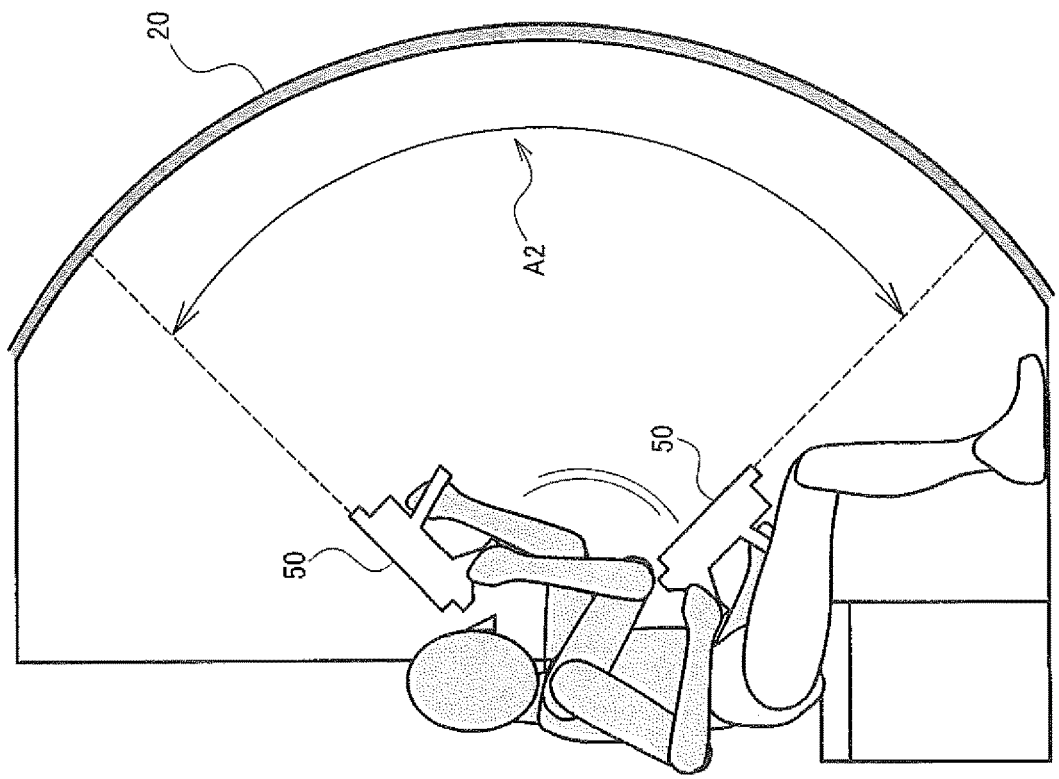
FIGS. 9A and 9B are views illustrating an example of a shooting game that is implemented using an image generation system according to one embodiment of the invention.
Figure 9A:
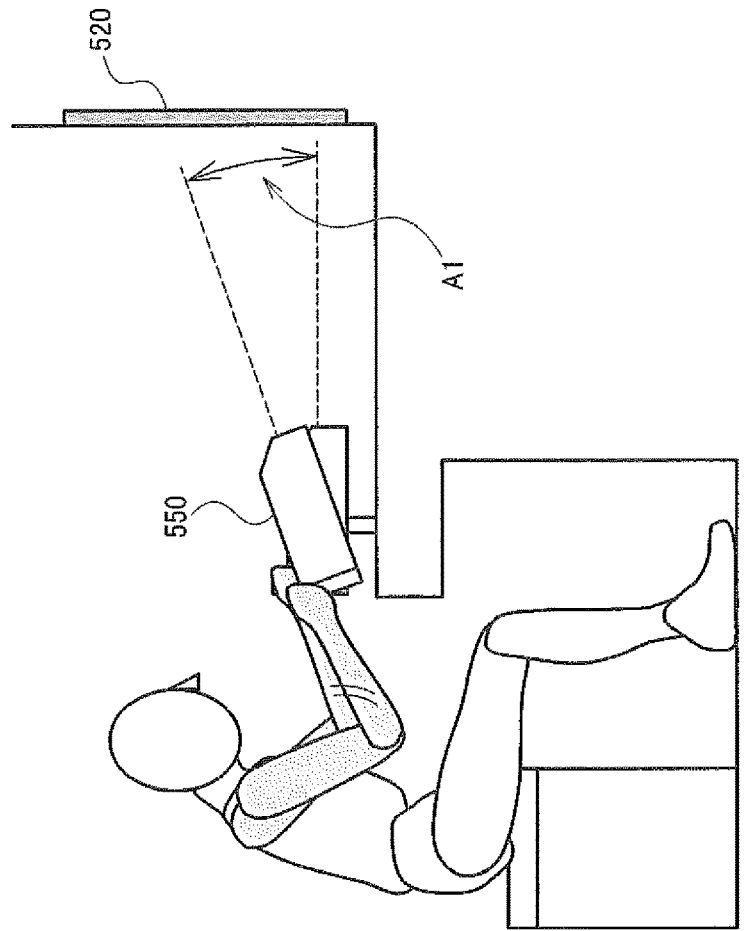
Figure 10A:
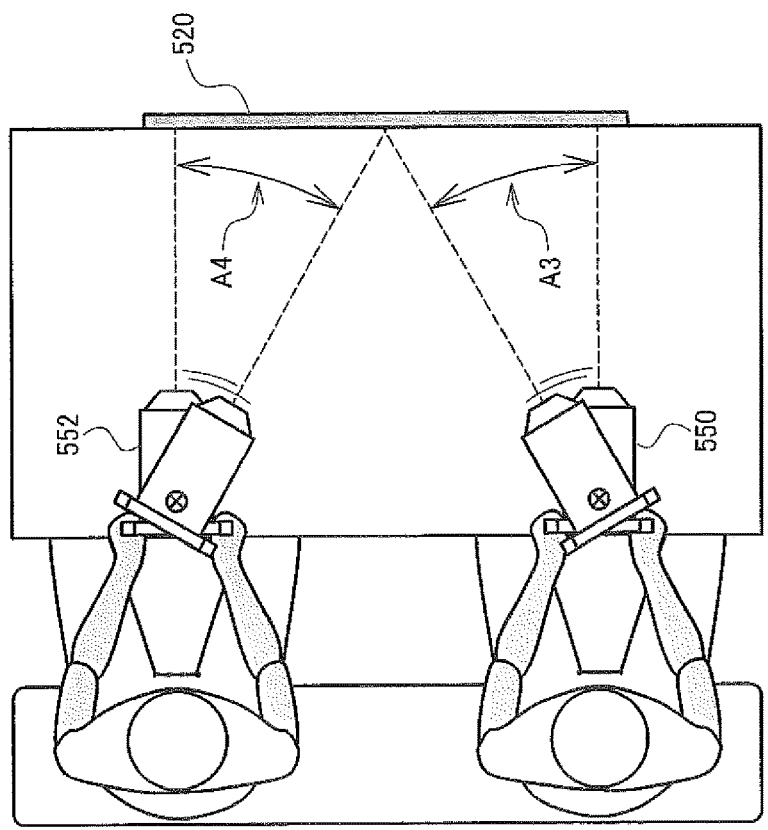
FIGS. 10A and 10B are views illustrating an example of a shooting game that is implemented using an image generation system according to one embodiment of the invention.
Figure 10B:
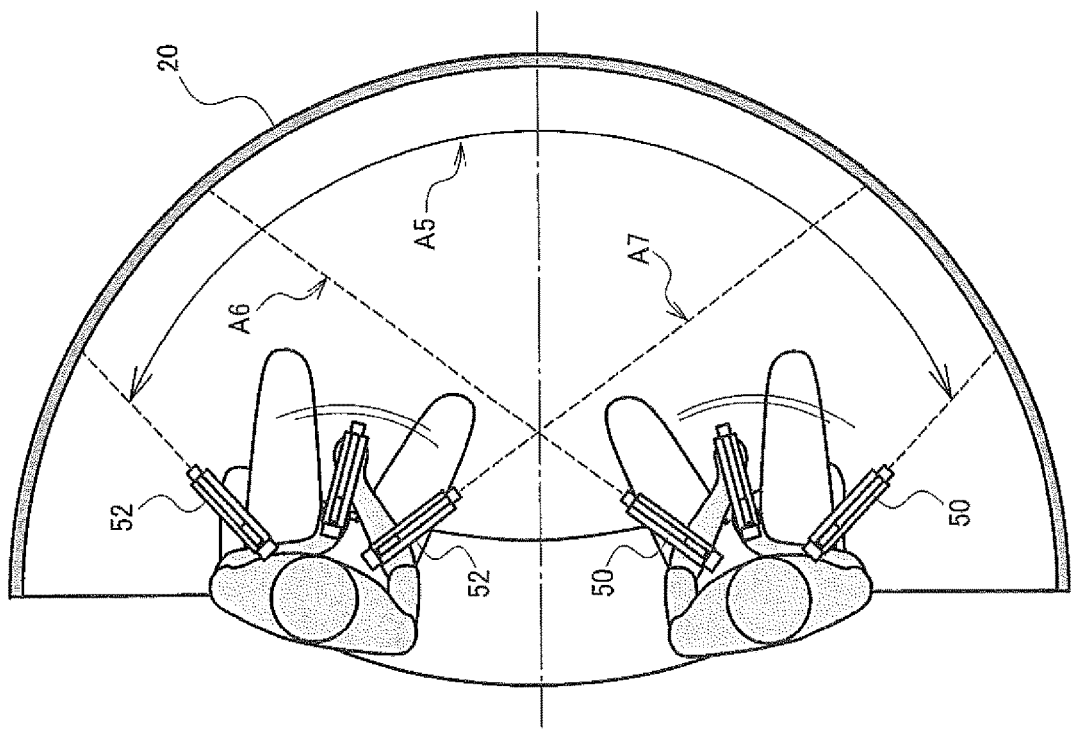

FIGS. 9A and 10A are views illustrating a shooting game that is implemented by a known image generation system, and FIGS. 9B and 10B are views illustrating the shooting game that is implemented by the image generation system according to one embodiment of the invention.

The shooting game illustrated in FIG. 9A that is implemented by a known image generation system is designed so that a game image is displayed on a plane screen 520 (e.g., LCD or CRT), and the player plays the shooting game by operating an emitting element 550 (gun-type controller) while observing the game image. Since the game image is displayed on the plane screen 520, the shooting range that can be achieved using the emitting element 550 is narrow (see A1).

The shooting game illustrated in FIG. 9B that is implemented by the image generation system according to one embodiment of the invention is designed so that the projection device 30 projects the projection image onto the screen 20 having a dome-like shape (curved shape). The player plays the shooting game while holding the emitting element 50, and observing the projection image projected onto the screen 20. Since the projection image (i.e., game image) is displayed on the screen 20 having a dome-like shape, the shooting range that can be achieved using the emitting element 50 is wide (see A2). Specifically, the image generation system according to one embodiment of the invention can implement a shooting game in which the player can shoot (cause a bullet to hit) an enemy that attacks from above or an enemy that attacks from below within the screen 20.

FIGS. 10A and 10B illustrate an example of a multi-player shooting game in which two players play the game.

The multi-player shooting game illustrated in FIG. 10A that is implemented by a known image generation system is designed so that an image is displayed on the plane screen 520. Therefore, the shooting range that can be achieved using an emitting element 550 that is operated by the first player is narrow (see A3), and the shooting range that can be achieved using an emitting element 552 that is operated by the second player is also narrow (see A4).

The shooting game illustrated in FIG. 10B that is implemented by the image generation system according to one embodiment of the invention is designed so that the projection device 30 projects the projection image onto the screen 20 having a dome-like shape that is provided so as to surround the first player and the second player. Therefore, the shooting range that can be achieved using an emitting element 50 that is operated by the first player and the shooting range that can be achieved using an emitting element 52 that is operated by the second player are very wide (see A5). For example, the first player can shoot (cause a bullet to hit) an enemy that appears in front of the second player (see A6). Likewise, the second player can shoot (cause a bullet to hit) an enemy that appears in front of the first player (see A7).

As described above, one embodiment of the invention utilizes the large screen 20 that has a dome-like shape and covers the entire field of view of two players (or one player). This makes it possible for two players to enjoy a novel shooting game (gun game) in which the players can shoot enemies that attack from all directions while being fully involved in the game. Therefore, it is possible to provide a shooting game that allows a wide variety of players (e.g., couple, family, and group) to enjoy the game.

An important problem when the screen 20 having a dome-like shape (curved shape) is used is how to implement an accurate hit determination process with respect to a bullet fired from the emitting element 50. One embodiment of the invention employs the hit determination method described below in order to solve this problem.

Figure 11:
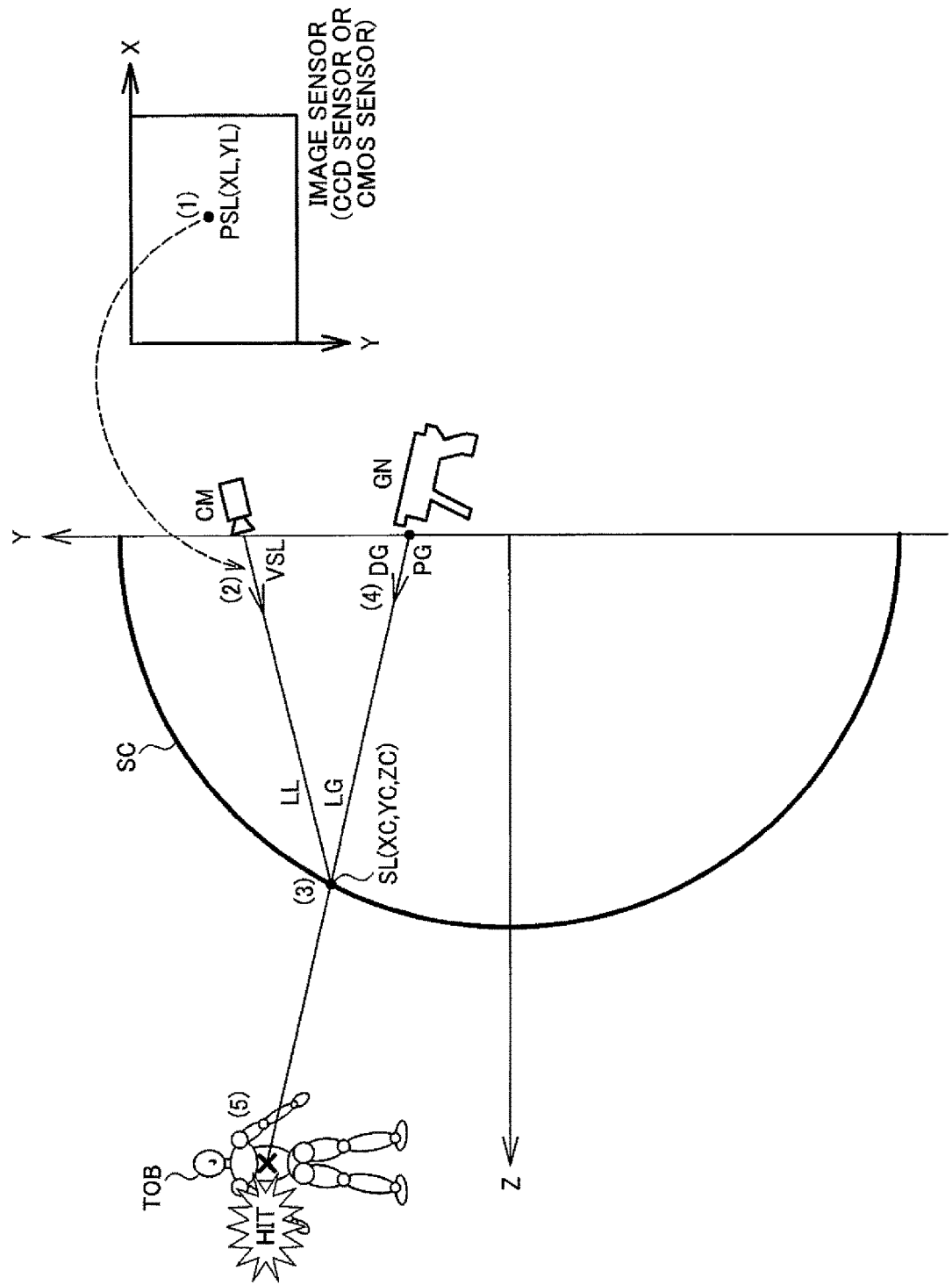
FIG. 11 is a view illustrating a hit determination method according to one embodiment of the invention.

FIG. 11 is a view illustrating the hit determination method according to one embodiment of the invention. The hit determination method according to one embodiment of the invention is implemented by sequentially performing the following steps (1), (2), (3), (4), and (5) (see FIG. 11).

(1) The position PSL(XL, YL) of a spotlight formed by light emitted from an emitting element GN within the captured image is detected. The coordinates of the position PSL(XL, YL) are represented using the coordinate system of the image sensor (e.g., CCD coordinate system), for example.

Specifically, infrared light is emitted from the emitting element GN (gun-type device) that is held by the player, and a spotlight (i.e., a spotlight formed on the screen 20 illustrated in FIGS. 1 and 2) formed by the infrared light is captured (photographed) using an imaging section CM that is provided with a wide-angle lens (e.g., fish-eye lens). An image analysis process is performed on the resulting captured image to calculate the coordinates (i.e., the coordinates represented using the CCD coordinate system) of the position PSL(XL, YL) of the spotlight (red point) (formed by the infrared light) within the captured image.

(2) A direction vector VSL that corresponds to the spotlight is calculated based on the position PSL(XL, YL) of the spotlight within the captured image. Specifically, the direction vector VSL of the spotlight viewed from the imaging section CM is calculated. The direction vector VSL is a direction vector in the camera coordinate system of the imaging section CM, for example.

For example, the spotlight formed by the emitting element GN on the screen 20 illustrated in FIGS. 1 and 2 is captured at the position PSL(XL, YL) of the image sensor through the optical system of the imaging section CM. Therefore, the direction vector VSL (opposite to the incidence direction) that corresponds to the incidence direction of the spotlight can be calculated based on information about the optical system (lens) of the imaging section CM. For example, the imaging section CM has an enlarged field of view due to the refraction effect of the wide-angle lens (fish-eye lens). For example, the imaging section CM has a horizontal field of view of about 120°, and a vertical field of view of about 90°. It is possible to allow the wide projection area of the screen 20 having a dome-like shape to lie within the imaging range of the imaging section CM by utilizing the fish-eye lens that enlarges the field of view in this manner. The direction vector VSL is calculated taking account of the field of view of the imaging section CM.

(3) The position of the intersection SL(XC, YC, ZC) of a straight line LL that extends along the direction vector VSL with the projection screen SC is calculated. In one embodiment of the invention, the screen spotlight position (i.e., the position of the spotlight on the screen 20) is calculated based on the position PSL(XL, YL) of the spotlight within the captured image, and the intersection SL(XC, YC, ZC) illustrated in FIG. 11 corresponds to the screen spotlight position.

More specifically, the direction vector VSL that is represented using the camera coordinate system is converted into a world coordinate system (dome coordinate system) in the real world. Specifically, the direction vector VSL (direction represented by the direction vector VSL) that is represented using the camera coordinate system is converted into a direction in the world coordinate system so that the placement direction (imaging direction) of the imaging section CM is reflected in the direction vector VSL. Since the imaging section CM is disposed to be tilted by a given angle in the downward direction (see FIGS. 1 and 2, for example), the tilt angle and the like are reflected in the direction vector VSL.

The position of the intersection SL(XC, YC, ZC) of the straight line LL that extends along the direction vector VSL with the screen SC is then calculated. For example, when the screen SC is represented by a mathematical formula (e.g., ellipsoid formula), the position of the intersection SL is calculated using a mathematical formula that represents the straight line LL that extends along the direction vector VSL and a mathematical formula that represents the screen SC. The mathematical formula that represents the screen SC is used as the shape information about the screen SC. The position of the intersection SL(XC, YC, ZC) thus calculated corresponds to the position of the spotlight on the screen SC.

(4) The direction from a set position PG that has been set to be a representative position of the emitting element GN toward the position (screen spotlight position) of the intersection SL(XC, YC, ZC) is calculated to be the emission direction DG (gun direction) of the emitting element GN.

The set position PG is an ideal position of the emitting element GN in the real world. For example, the set position PG may be represented by fixed coordinate values (X, Y and Z-coordinate values) with respect to the position (reference position) of the seating surface of the player's seat 10 illustrated in FIGS. 1 and 2. Specifically, the coordinates of the set position PG are determined on the assumption that the emitting element GN is situated at the set position PG. Note that the set position PG may be a representative position of the player (i.e., the position of a specific part of the player). For example, when it is possible to detect the position of the emitting element GN (or the position of the player), the detected position may be used as the set position PG. In this case, the set position PG is a variable position.

(5) The hit determination process that determines whether or not the object TOB situated in the object space has been hit is performed based on the calculated emission direction DG. Specifically, the hit determination process that determines whether or not the object TOB has been hit is performed based on a straight line LG that extends along the emission direction DG on the assumption that the emission direction DG (emission angle) coincides with the direction indicated by the emitting element GN (gun) that is held by the player. For example, the hit determination process is implemented by performing a process that determines whether or not the straight line LG intersects the object TOB. Specifically, the hit determination process that determines whether or not the object TOB has been hit is performed by extending a ray along the emission direction DG.

Figure 12:
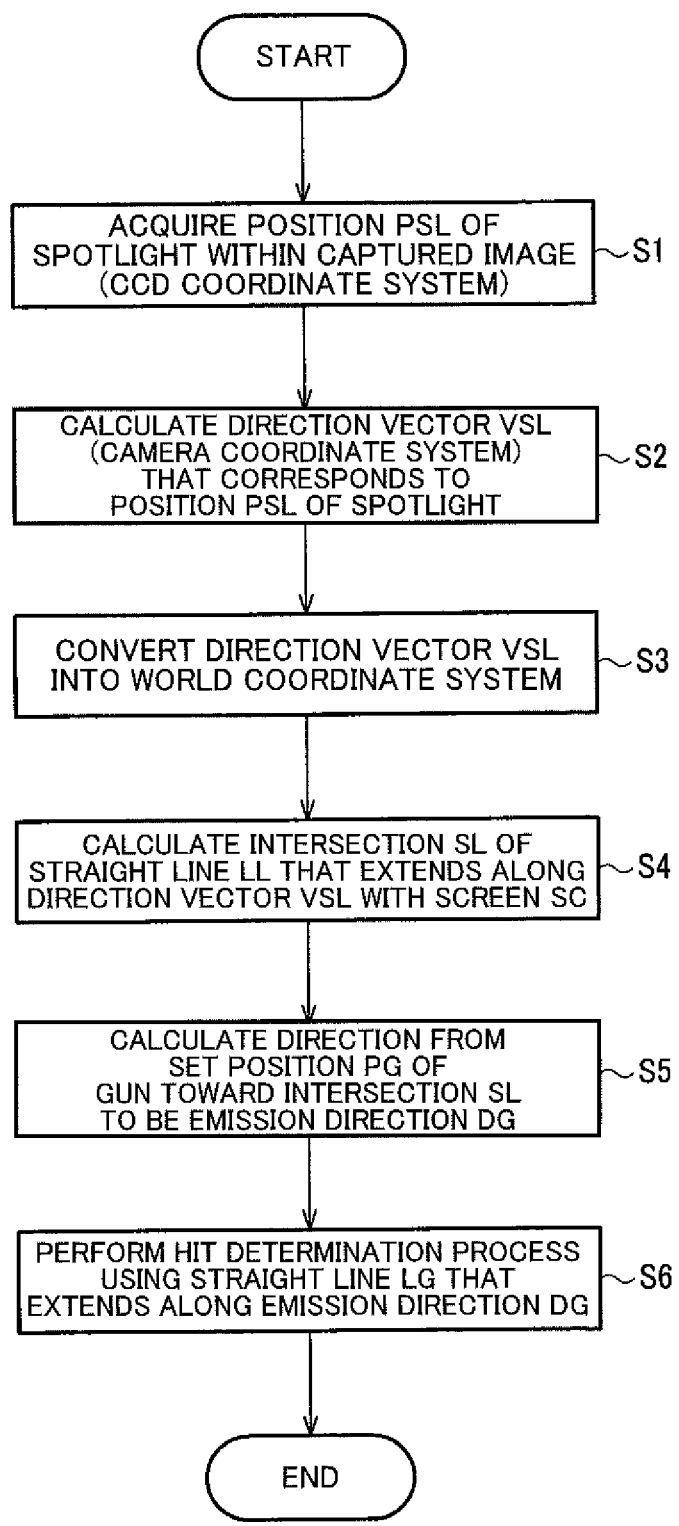
FIG. 12 is a flowchart illustrating a hit determination process according to one embodiment of the invention.

FIG. 12 is a flowchart illustrating the hit determination process according to one embodiment of the invention that has been described above.

The position PSL of the spotlight within the captured image (CCD coordinate system) is calculated (step S1). The direction vector VSL (camera coordinate system) that corresponds to the position PSL of the spotlight is calculated (step S2).

The calculated direction vector VSL is converted from the camera coordinate system into the world coordinate system (step S3). The position of the intersection SL of the straight line LL that extends along the direction vector VSL with the screen SC is calculated (step S4).

The direction from the set position PG of the gun toward the position of the intersection SL is calculated to be the emission direction DG (step S5). The hit determination process is performed using the straight line LG that extends along the calculated emission direction DG (step S6).

The method according to one embodiment of the invention thus makes it possible for the image generation system that projects the projection image onto the screen 20 having a dome-like shape, to implement an appropriate hit determination process that reflects the dome-like shape and the like.

According to one embodiment of the invention, the screen spotlight position that is the position of the spotlight on the screen SC is calculated from the position PSL of the spotlight within the captured image. More specifically, the direction vector VSL that corresponds to the position PSL of the spotlight within the captured image is calculated, and the position of the intersection SL of the direction vector VSL with the screen SC is calculated to be the screen spotlight position. Therefore, it is possible to calculate the position of the intersection SL that reflects the dome-like shape of the screen SC. It is also possible to deal with a situation in which the shape of the screen SC has been changed, for example. Since the information about the optical system of the imaging section CM can be used when calculating the direction vector VSL from the position PSL, it is possible to calculate the position of the intersection SL that also reflects the information about the optical system of the imaging section CM.

The position of the intersection SL corresponds to the position of the spotlight that is formed on the screen 20 by the emitting element GN in the real world. Therefore, it is possible to implement an appropriate hit determination process that reflects the dome-like shape and the like by setting the emission direction DG of the emitting element GN using the position of the intersection SL, and performing the hit determination process that determines whether or not the object TOB has been hit.

As a comparative example, the projection image may be projected onto a plane screen that is configured by only a single plane, the position of a spotlight formed on the plane screen by the emitting element may be detected based on the captured image that has been captured by the imaging section, and the emission direction may be calculated based only on the position of the spotlight to determine whether or not the object TOB has been hit.

However, the method according to the comparative example has a problem in that it is possible to implement an accurate hit determination process when the screen is a plane screen, but it is impossible to implement an accurate hit determination process when the screen is configured by one curved surface or a plurality of surfaces (e.g., the projection screen according to one embodiment of the invention). Specifically, the emission direction can be uniquely determined based only on the position of the spotlight formed on the screen when the screen is a plane screen. However, the emission direction cannot be uniquely determined when the screen is a projection screen used for projection mapping.

According to one embodiment of the invention, the set position that is set to be the representative position of the emitting element 50 or the player is provided. The direction from the set position toward the screen spotlight position is set to be the emission direction, and the hit determination process is performed. According to this configuration, it is possible to implement an accurate hit determination process that reflects the shape of the projection screen even when the game illustrated in FIGS. 9B and 10B is implemented using a projection screen that is configured by one curved surface or a plurality of surfaces, for example.

In one embodiment of the invention, the position of the spotlight may be detected by capturing the projection area using the imaging section CM that includes a fish-eye lens as the wide-angle lens. This makes it possible to deal with a situation in which the screen 20 has a dome-like shape, and the projection area onto which the projection image is projected is very wide.

According to one embodiment of the invention, the shooting range that can be achieved using the emitting element 50 is very wide (see A2 in FIG. 9B and A5 in FIG. 10B). Therefore, the player can shoot (cause a bullet to hit) an enemy that attacks from above or below within the screen 20 (see FIG. 9B), for example. In the example illustrated in FIG. 10B, the first player can shoot (cause a bullet to hit) an enemy that appears in front of the second player (see A6), and the second player can shoot (cause a bullet to hit) an enemy that appears in front of the first player (see A7).

In the example illustrated FIG. 10B, the projection device 30 projects the projection image onto the screen 20 having a dome-like shape that is provided so as to surround the first player and the second player. Therefore, it is difficult to detect the position of a spotlight formed on the screen 20 using an imaging section that includes a normal lens.

When a fish-eye lens is provided to the imaging section CM as the wide-angle lens, it is possible to set the imaging range so as to cover the entirety of the large screen 20 having a dome-like shape (see FIG. 10B) by utilizing the fish-eye lens, and appropriately detect the position of a spotlight formed on the screen 20. Therefore, it is possible to implement a spotlight detection system that is optimum for the shooting game illustrated in FIGS. 9B and 10B.

2.4 Sight Object

When implementing a shooting game, it is necessary to provide a sight object that allows the player to aim at an enemy. The sight object used for a shooting game is normally implemented using a two-dimensional object that is displayed (disposed) on the screen.

However, the projection image that is projected by the image generation system that performs the projection mapping process with respect to the screen 20 having a dome-like shape is deformed so as to reflect the dome-like shape (see FIG. 8). Therefore, it is difficult to display an appropriate sight within the projection image using the method that displays (disposes) a two-dimensional sight object on the screen.

According to one embodiment of the invention, the position of the sight object that is disposed in the object space is calculated based on the emission direction DG calculated as described above with reference to FIG. 11.

Figure 13:
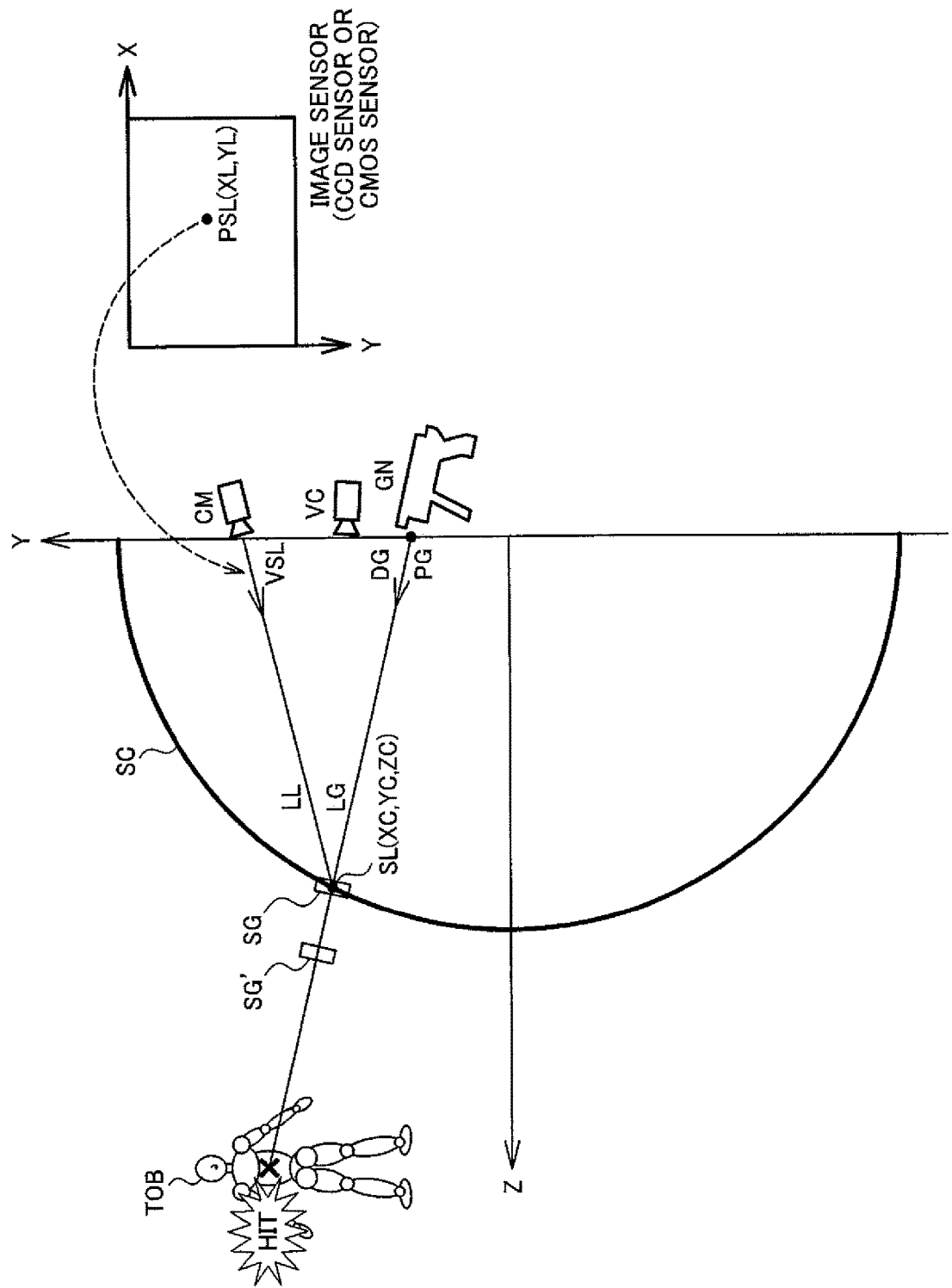
FIG. 13 is a view illustrating a method according to one embodiment of the invention that disposes a sight object.

In the example illustrated in FIG. 13, the emission direction DG of the emitting element GN has been calculated as described above with reference to FIG. 11. In this case, the position of the sight object SG that is disposed in the object space is calculated based on the emission direction DG, and the sight object SG is disposed at the calculated position. Specifically, the sight object SG is disposed as a three-dimensional object (i.e., an object having three-dimensional coordinates) in the object space (virtual three-dimensional space) instead of disposing the sight object SG as a two-dimensional object on the screen. More specifically, the sight object SG is disposed on the straight line LG that extends along the emission direction DG. In the example illustrated in FIG. 13, the sight object SG is disposed at the position of the intersection of the straight line LG with the screen SC.

According to this configuration, the sight object SG is displayed in the direction in which the player aims the emitting element GN. For example, when the player has moved the emitting element GN in the upward direction, the downward direction, the rightward direction, or the leftward direction, the sight object SG also moves in the upward direction, the downward direction, the rightward direction, or the leftward direction in synchronization with the movement of the emitting element GN. The player can cause a bullet fired from the emitting element GN to hit the object TOB by pulling the trigger provided to the emitting element GN in a state in which the sight object SG overlaps the object TOB when viewed from the player.

Specifically, it is very difficult for the image generation system that performs the projection mapping process to determine the shape and the display state of the sight object when the method that disposes a two-dimensional sight object on the screen is used.

According to one embodiment of the invention, the sight object SG is disposed in the object space by effectively utilizing the position of the intersection SL and the emission direction DG that have been calculated to implement the hit determination process. According to this configuration, images of the sight objects SG1 and SG2 that appropriately reflect the shape of the screen 20 are displayed within the projection image (see FIG. 8). It is possible to display images of the sight objects SG1 and SG2 that have an appropriate shape when viewed from the player by projecting the resulting projection image onto the screen 20. Therefore, it is possible to display the sight object that is suitable for the image generation system that performs the projection mapping process.

Figure 14:
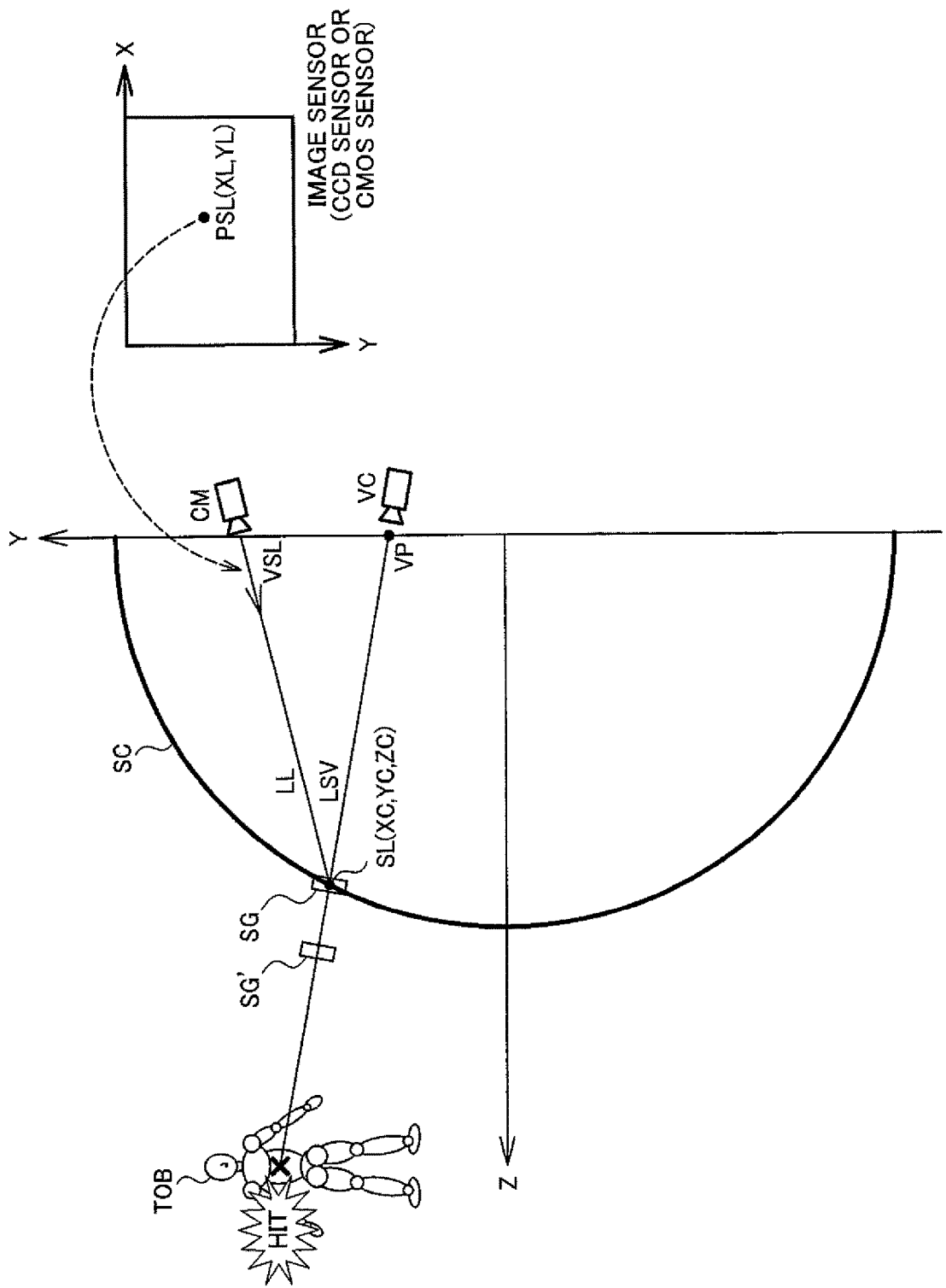
FIG. 14 is a view illustrating a method according to one embodiment of the invention that disposes a sight object.

Although FIG. 13 illustrates an example in which the sight object SG is disposed on the straight line LG that extends along the emission direction DG, the configuration is not limited thereto. As illustrated in FIG. 14, the sight object SG may be disposed on a straight line LSV that connects the position VP of the virtual camera VC and the position of the intersection SL, for example. According to this configuration, it is possible to dispose the sight object SG so that the sight object SG can be appropriately observed from the viewpoint of the player.

The sight object SG need not necessarily disposed at the position of the intersection with respect to the screen SC. As illustrated in FIGS. 13 and 14, a sight object SG' may be disposed at a position deeper than the position of the intersection with respect to the screen SC, for example. In the example illustrated in FIG. 14, the sight object SG and the sight object SG' are observed at an identical position from the viewpoint (virtual camera VC) of the player. In the example illustrated in FIG. 13, the sight object SG and the sight object SG' are observed at positions that differ from each other to some extent from the viewpoint (virtual camera VC) of the player.

2.5 Direction Vector VSL

The details of the method that calculates the direction vector VSL are described below.

Figure 15A:
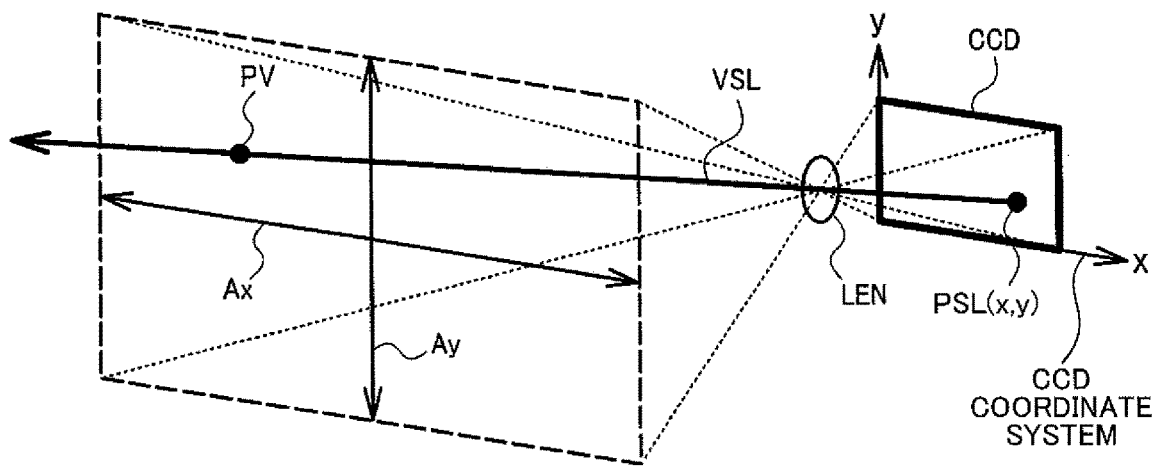
FIGS. 15A and 15B are views illustrating a method that calculates a direction vector of a spotlight.
Figure 15B:
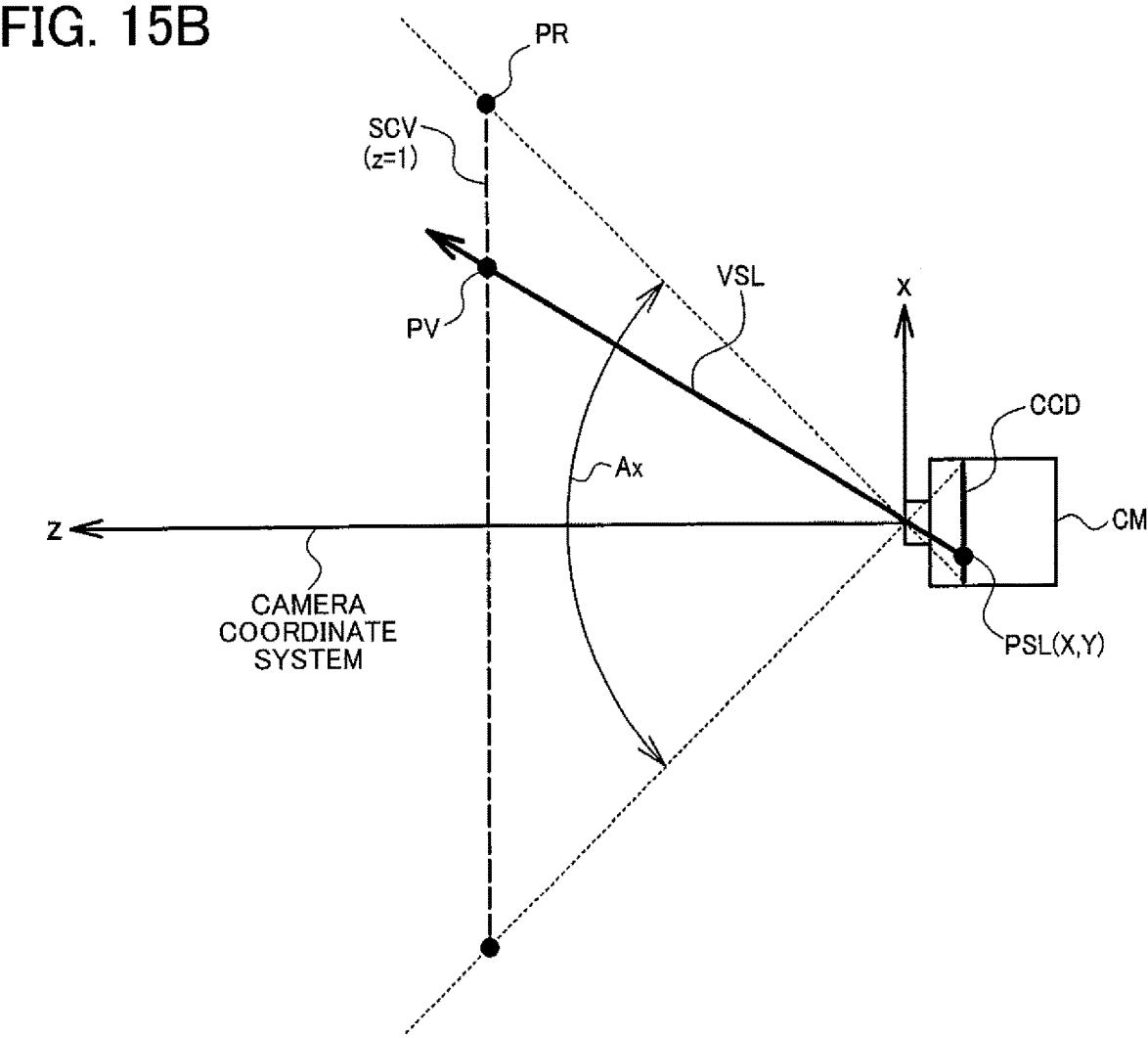

FIGS. 15A and 15B are views illustrating the method that calculates the direction vector VSL when using an ideal lens LEN (e.g., pinhole camera model).

In FIG. 15A, the position PSL(x, y) of a spotlight in a CCD (i.e., image sensor) coordinate system has been detected. The direction vector VSL in the camera coordinate system is calculated from the position PSL(x, y) in the CCD coordinate system.

For example, the range in the CCD coordinate system is (0 to 1) in FIG. 15A, and has been converted from (0 to 1) to (−1 to +1) in FIG. 15B. In FIG. 15B, the direction of the Y-axis is reversed with respect to FIG. 15A. In FIG. 15B, the Y-axis extends in the forward direction with respect to the sheet. When the position PSL in FIG. 15A is represented by (x, y), and the position PSL in FIG. 15B is represented by (X, Y), the following expression (1) is obtained.

$$(X,Y)=(2x-1,-(2y-1)) \quad (1)$$

When the horizontal angle of view is represented by Ax, the vertical angle of view is represented by Ay, and the Z-coordinate value of the virtual screen SCV in FIG. 15B is Z=1, the coordinates of the point PR illustrated in FIG. 15B are represented by the following expression (2).

$$PR=(\tan(Ax/2),0,1) \quad (2)$$

Therefore, the coordinates of the point PV are represented by the following expression (3).

$$PV=((2x-1)\times(\tan(Ax/2)),-(2y-1)\times(\tan(Ay/2)),1) \quad (3)$$

The coordinates of the point PV correspond to the direction vector VSL in the camera coordinate system (see the following expression (4)).

$$VSL=((2x-1)\times(\tan(Ax/2)),-(2y-1)\times(\tan(Ay/2)),1) \quad (4)$$

Figure 16A:
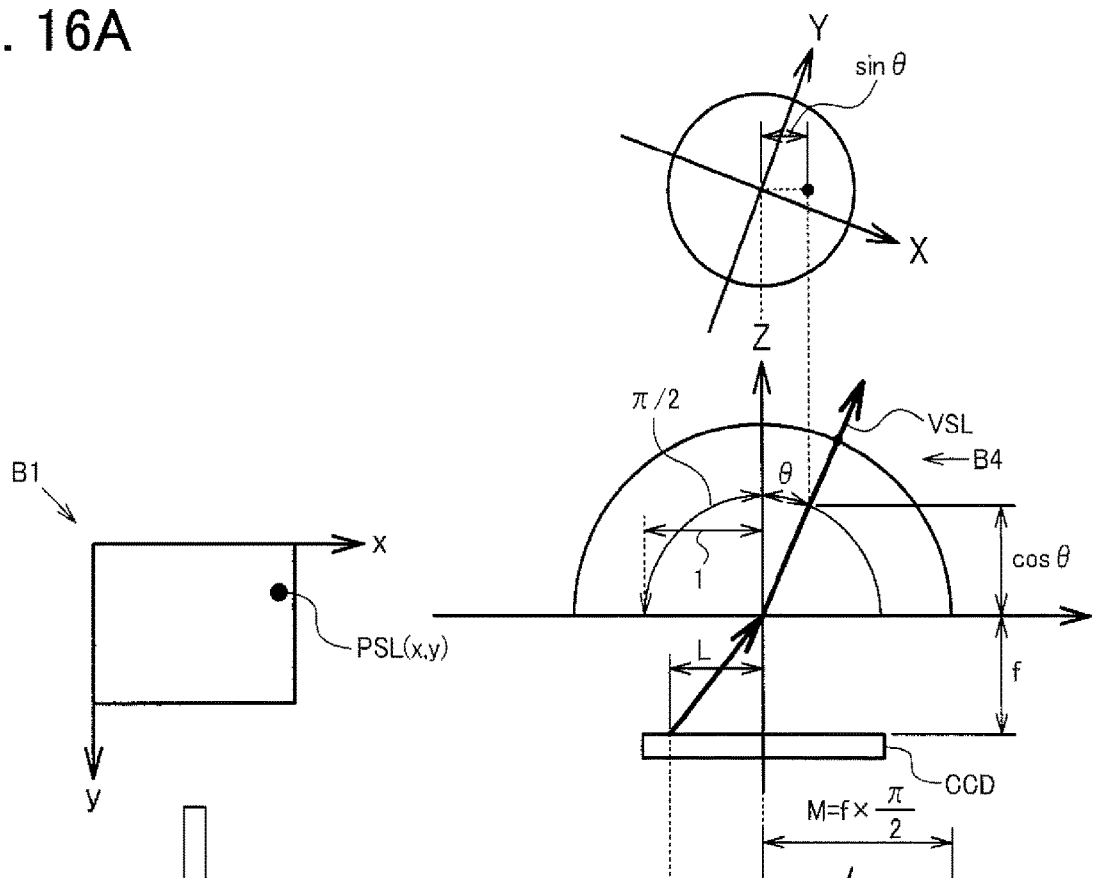
FIGS. 16A and 16B are views illustrating a method that calculates a direction vector of a spotlight.
Figure 16B:
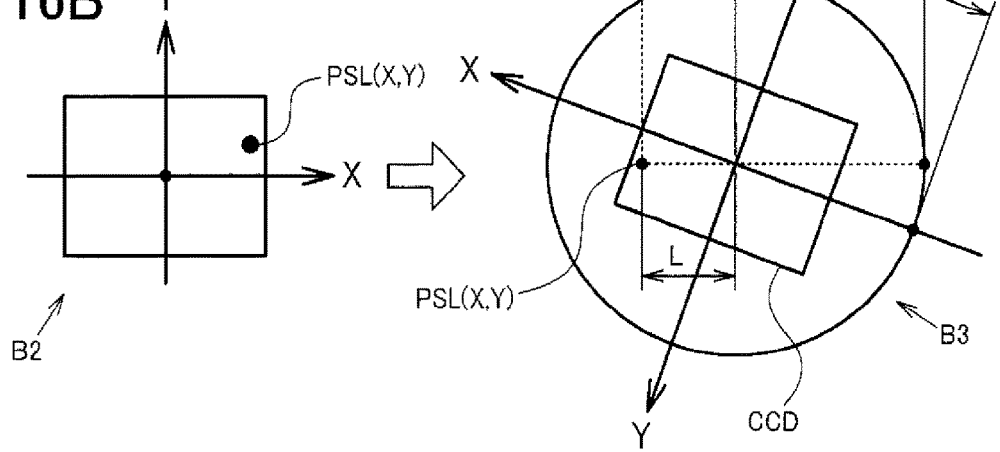

FIG. 16 is a view illustrating the method that calculates the direction vector VSL when using an fθ lens that is normally used as a fish-eye lens.

In FIG. 16, a coordinate transformation process (from (x, y) to (X, Y)) is performed (see B1 and B2) in the same manner as in FIGS. 15A and 15B. Specifically, the coordinate transformation process is performed so that the center of the lens coincides with the center (origin) of the CCD. The direction of the Y-axis is reversed.

Since the image is reversed due to the lens, the coordinates of the point PSL(X, Y) are reversed in the vertical direction and the horizontal direction (see B3 in FIG. 16). The distance from the origin to the point PSL(X, Y) is represented by L=(X2+Y2)½.

The fθ lens is characterized in that a light ray incident on the fθ lens at an angle θ forms an image at a position situated at a distance fθ from the center (optical axis) of the lens at a position situated away from the ID lens by a focal length f. Therefore, the following expression (5) is satisfied with regard to the angle θ that corresponds to L.

$$L=f\theta \quad (5)$$

The distance from the center (i.e., the origin of the CCD coordinate system) of the fθ lens corresponding to θ=0 to π/2 is 0 to M. Specifically, the distance when a light ray incident on the fθ lens at an angle of θ=π/2 forms an image at a position situated away from the fθ lens by the focal length f is M. In this case, the following expression (6) is satisfied.

$$M=f\times(\pi/2) \quad (6)$$

The angle θ is calculated as follows (see the following expression (7)) from the expressions (5) and (6).

$$\theta=(L/M)\times(\pi/2) \quad (7)$$

Therefore, the direction vector VSL is calculated by the following expression (8) (see B4 in FIG. 16).

$$VSL=((X/L)\times\sin\theta,(Y/L)\times\sin\theta,\cos\theta) \quad (8)$$

Note that the method that calculates the direction vector VSL may be modified in various ways. For example, a known image correction process that corrects distortion due to the ID lens is performed on the captured image that has been captured by the imaging section 40 that includes the fθ lens (fish-eye lens). The direction vector VSL may be calculated by applying the method described above with reference to FIGS. 15A and 15B to the captured image that has been subjected to the image correction process. The actual lens normally has distortion that cannot be represented using a simple formula, differing from an ideal lens and an fθ lens. A method that generates a map that is used to correct distortion to obtain an image that corresponds to an ideal camera model by capturing an image or the like on which a lattice pattern is printed, and generates an image that corresponds to an ideal camera model, is normally used. The direction vector VSL may be calculated by applying the method described above with reference to FIGS. 15A and 15B after converting the image using the above method.

2.6 Adjustment of Spotlight Position Detection

When performing the spotlight position detection process as described above, it is necessary to perform a position detection adjustment process (gun initialization).

In the example illustrated in FIGS. 17A to 19, spotlight detection adjustment objects IT1, IT2, IT3, IT4, and IT5 are displayed within the projection image during the initial adjustment process.

Figure 17A:
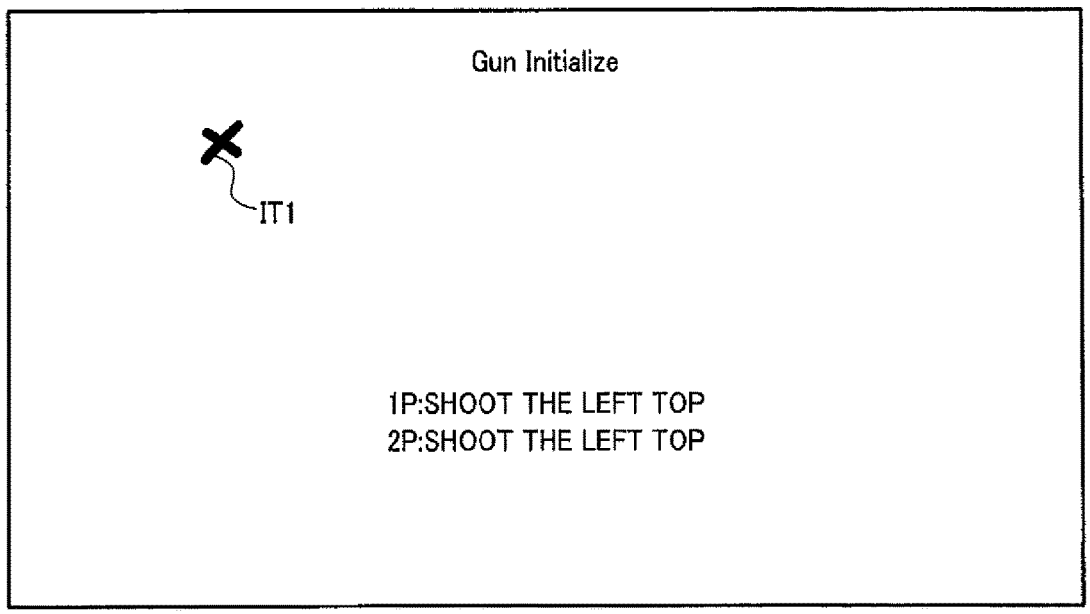
FIGS. 17A and 17B are views illustrating a spotlight detection adjustment object.
Figure 17B:
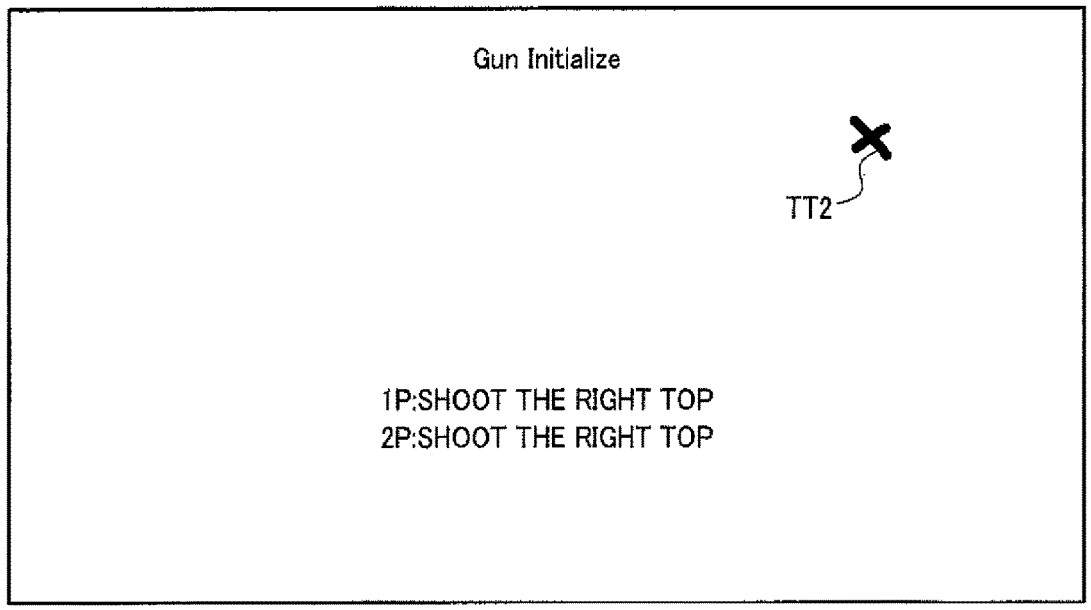
Figure 18A:
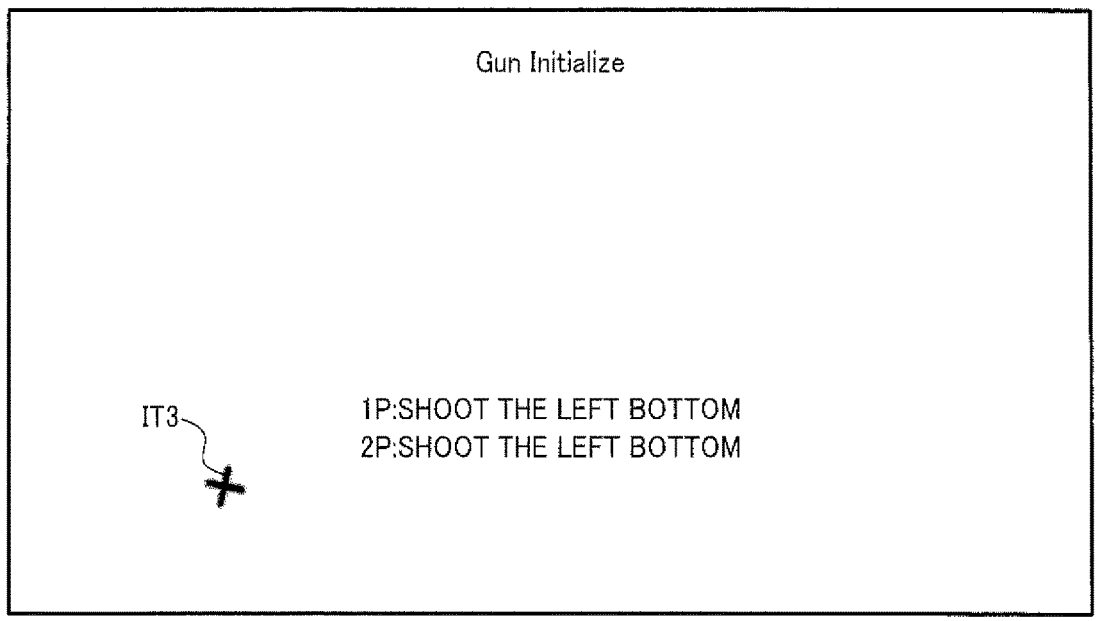
FIGS. 18A and 18B are views illustrating a spotlight detection adjustment object.
Figure 18B:
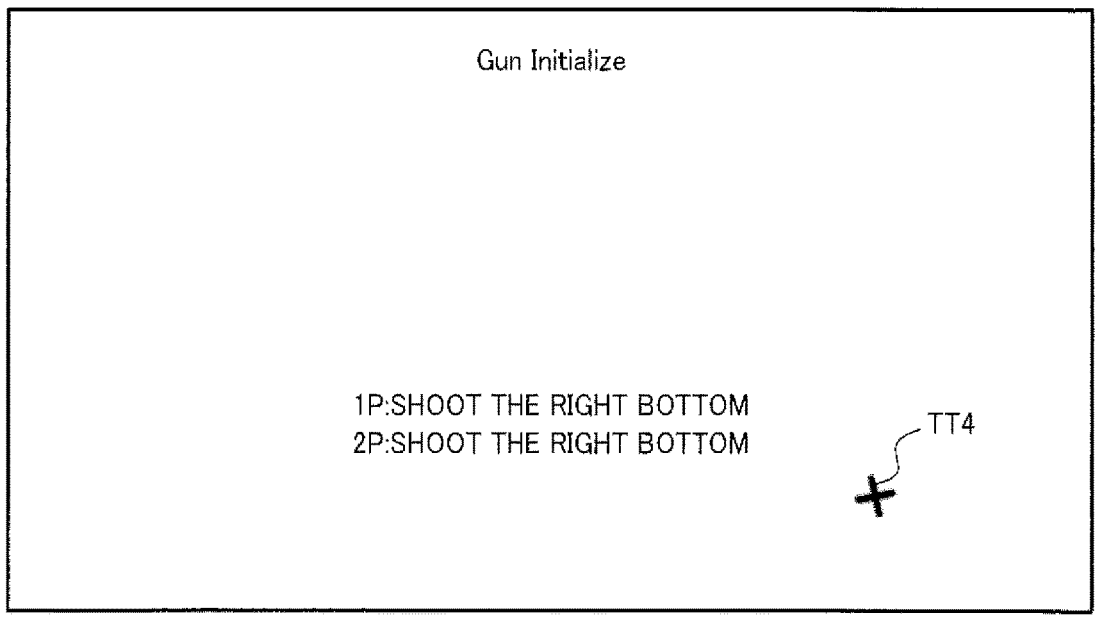
Figure 19:
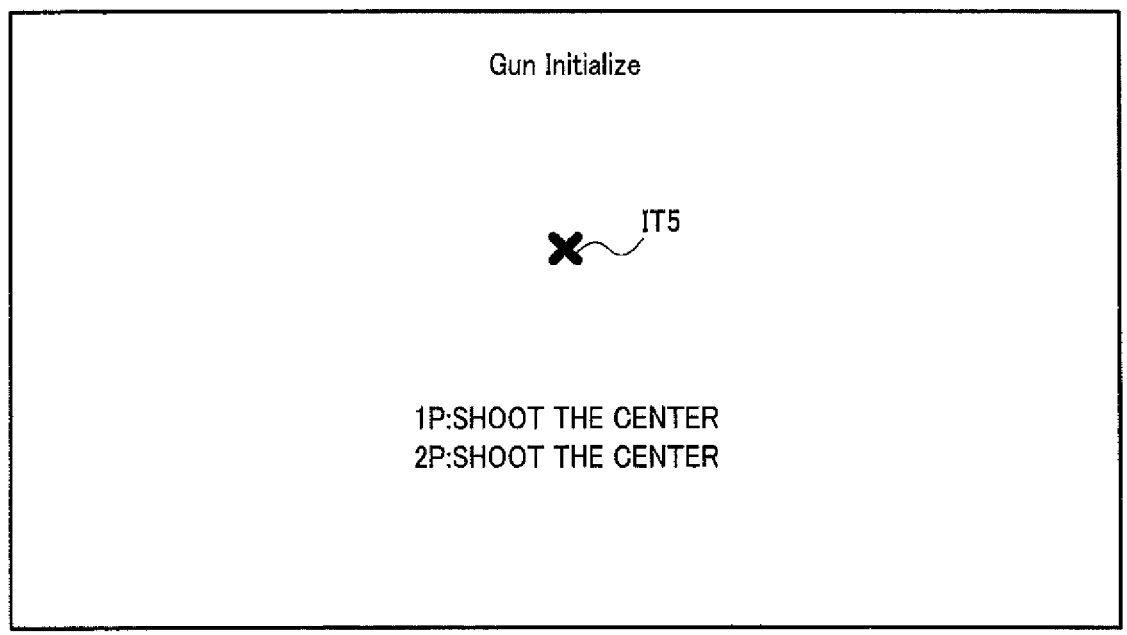
FIG. 19 is a view illustrating a spotlight detection adjustment object.

FIG. 17A illustrates a state in which the detection adjustment object IT1 is displayed in an upper left area of the screen. The operator (e.g., a staff member at an amusement center) pulls the trigger provided to the emitting element 50 aiming at the detection adjustment object IT1. FIG. 17B illustrates a state in which the detection adjustment object IT2 is displayed in an upper right area of the screen, FIG. 18A illustrates a state in which the detection adjustment object IT3 is displayed in a lower left area of the screen, FIG. 18B illustrates a state in which the detection adjustment object IT4 is displayed in a lower right area of the screen, and FIG. 19 illustrates a state in which the detection adjustment object IT5 is displayed at the center of the screen. The operator pulls the trigger provided to the emitting element 50 aiming at the detection adjustment object IT2, IT3, IT4, or IT5. Note that FIGS. 17A to 19 illustrate the projection image that has been subjected to the distortion correction process (see FIG. 8). Since the detection adjustment objects IT1, IT2, IT3, IT4, and IT5 are three-dimensional objects that are disposed in the object space, the images of the detection adjustment objects IT1, IT2, IT3, IT4, and IT5 are deformed.

For example, when the operator has pulled the trigger provided to the emitting element 50 aiming at the detection adjustment object IT1 that is displayed as illustrated in FIG. 17A, the differential angle between the detected emission direction DG (see FIG. 11) and the target emission direction DGT is calculated. The detected emission direction DG is corrected using the differential angle when the player plays the game to obtain an accurate emission direction DG. This makes it possible to implement an accurate spotlight position detection process.

For example, the installation position and the installation direction of the imaging section 40 (see FIGS. 1 and 2) may vary. Specifically, the imaging section 40 is provided to the projection device 30 so that the imaging direction (approximately) coincides with the projection direction of the projection device 30. The imaging section 40 is provided at a specific position with respect to the projection device 30. However, the installation position and the installation direction of the imaging section 40 may vary due to an assembly error during the production of the game system, for example. As a result, the imaging range of the imaging section 40 with respect to the projection area may also vary.

Figure 20A:
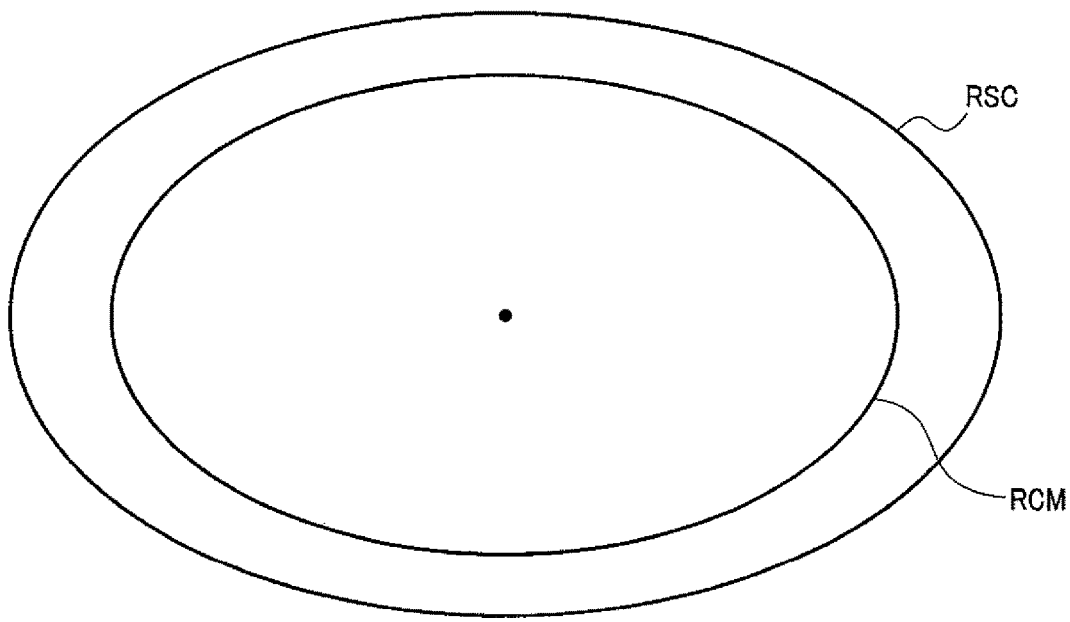
FIGS. 20A and 20B are views illustrating an imaging range of an imaging section.
Figure 20B:
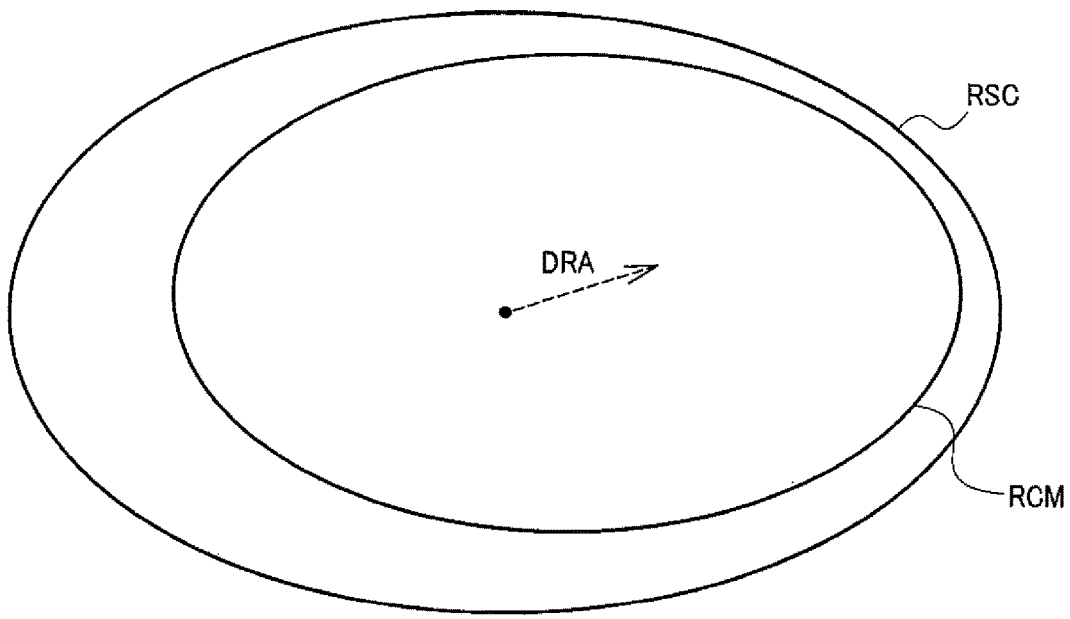

In the example illustrated in FIGS. 20A and 20B, RSC is the projection area (screen area) onto which the projection image is projected, and RCM is the imaging range of the imaging section 40 within the projection area RSC. The wide-angle lens (e.g., fish-eye lens) of the projection device 30 is wider in angle of view as compared with the wide-angle lens (e.g., fish-eye lens) of the imaging section 40. Specifically, the projection range of the projection device 30 is wider in angle of view as compared with the imaging range of the imaging section 40. Therefore, the imaging range RCM of the imaging section 40 is narrower than the projection area RSC onto which the projection image is projected (see FIG. 20A). If the installation position and the installation direction of the imaging section 40 vary, the imaging range RCM is shifted in a direction DRA with respect to the projection area RSC (see FIG. 20B), for example. The imaging range RCM may be shifted in various directions corresponding to the variations in the installation position and the installation direction of the imaging section 40.

Figure 21:
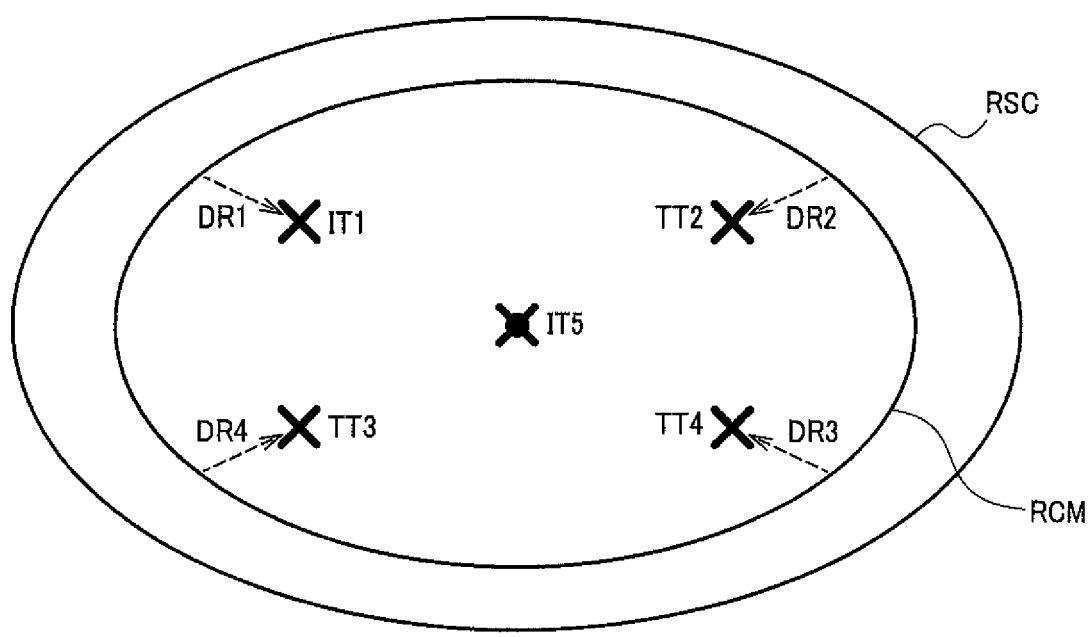
FIG. 21 is a view illustrating a method that disposes a spotlight detection adjustment object.

According to one embodiment of the invention, the projection image is generated so that the spotlight detection adjustment objects IT1, IT2, IT3, IT4, and IT5 are displayed within the imaging range RCM of the imaging section 40 (see FIG. 21). Specifically, the projection image is generated so that the spotlight detection adjustment objects IT1, IT2, IT3, IT4, and IT5 are displayed at positions situated inward from the boundary of the imaging range RCM by a given distance (e.g., DR1, DR2, DR3, and DR4). More specifically, the detection adjustment objects IT1 to IT5 are disposed in the object space so that the detection adjustment objects IT1 to IT5 are displayed within the imaging range RCM that is situated within the projection area RSC onto which the projection image is projected.

According to this configuration, it is possible to allow the detection adjustment objects IT1 to IT5 to be situated within the imaging range RCM even when the imaging range RCM is shifted with respect to the projection area RSC due to variations in the installation position and the installation direction of the imaging section 40 (see FIGS. 20A and 20B), for example.

For example, it is impossible to implement the adjustment process (gun initialization) illustrated in FIGS. 17A to 19 when the detection adjustment objects IT1 to IT5 are not displayed within the imaging range RCM.

For example, when the imaging range RCM has been shifted in the upper right direction (see FIG. 20B), and the detection adjustment object IT3 (that is situated in a lower left area of the screen) is not displayed within the imaging range RCM, a spotlight that has been formed aiming at the detection adjustment object IT3 is not captured by the imaging section 40 when the operator has pulled the trigger provided to the emitting element 50 aiming at the detection adjustment object IT3 during the initial adjustment process. In this case, since the emission direction DG that corresponds to the detection adjustment object IT3 cannot be detected, it may be impossible to implement the correction process.

According to one embodiment of the invention, since the detection adjustment objects IT1 to IT5 are displayed at positions inward from the boundary of the imaging range RCM (see FIG. 21), it is possible to prevent the occurrence of the above situation.

Note that the spotlight position detection adjustment process may be performed by displaying the detection adjustment object or the like within the projection image, capturing the detection adjustment object using an imaging section that can capture visible light, and performing an image analysis process on the captured image. For example, a barcode image object (i.e., detection adjustment object) is displayed at each corner of the projection image. The barcode image objects are captured using an imaging section that can capture visible light, and an image analysis process is performed on the captured image to detect a shift in the display position of each barcode image object to implement the spotlight position detection adjustment process. In this case, the imaging section that can capture visible light is implemented by switching the filter provided to the imaging section 40 that emits infrared light, for example. For example, an image is captured through an infrared filter when detecting a spotlight formed by infrared light, and an image is captured so that imaging light does not pass through the infrared filter when capturing the barcode image object.

In this case, the detection adjustment object is not limited to the barcode image object. For example, four objects that differ in color may be respectively displayed at the four corners of the projection image. Alternatively, laser light or the like may be applied to each corner of the projection image, and an image analysis process may be performed on the laser light irradiation position to implement the spotlight position detection adjustment process.

In one embodiment of the invention, a process that determines the imaging range RCM of the imaging section 40 may be performed. For example, the imaging range RCM of the imaging section 40 is determined based on a second captured image obtained by capturing the projection image, or historical information about the spotlight detection position.

For example, a projection image having a specific image pattern is displayed, and captured using the imaging section that can capture visible light, and an image analysis process is performed on the captured image (i.e., second captured image) to determined the boundary or the like of the imaging range RCM. Alternatively, the boundary of the imaging range RCM may be detected based on the history of the spotlight detection position when the operator has shaken the emitting element 50 in the upward direction, the downward direction, the rightward direction, and the leftward direction. Alternatively, the boundary of the imaging range RCM may be detected based on the history of the spotlight detection position based on the operation performed by the player who played the game before the current player.

Figure 22A:
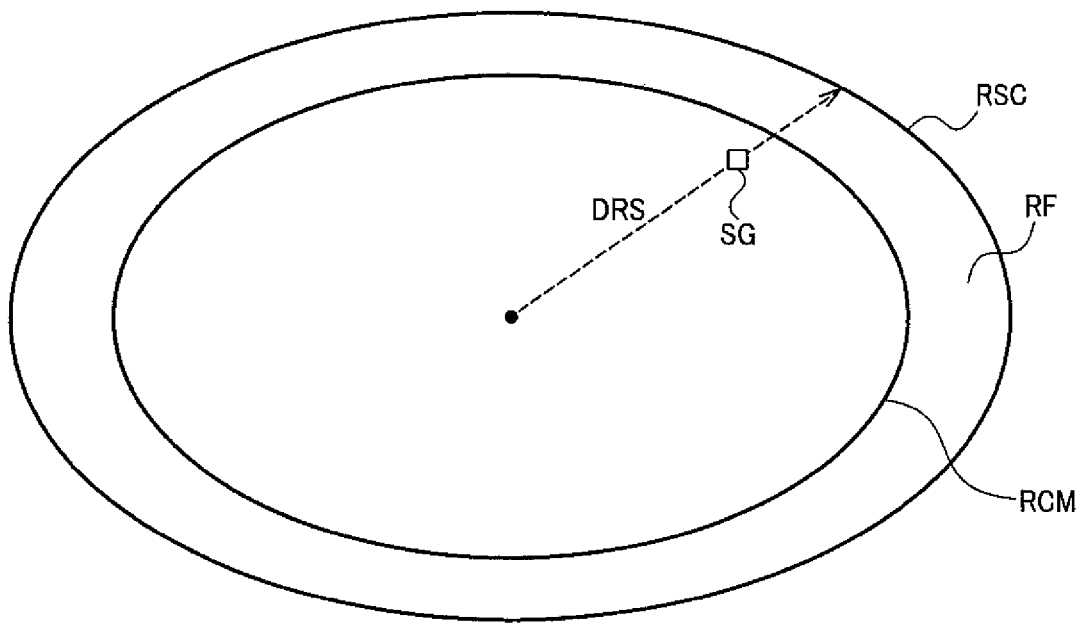
FIGS. 22A and 22B are views illustrating a sight object display control method.
Figure 22B:
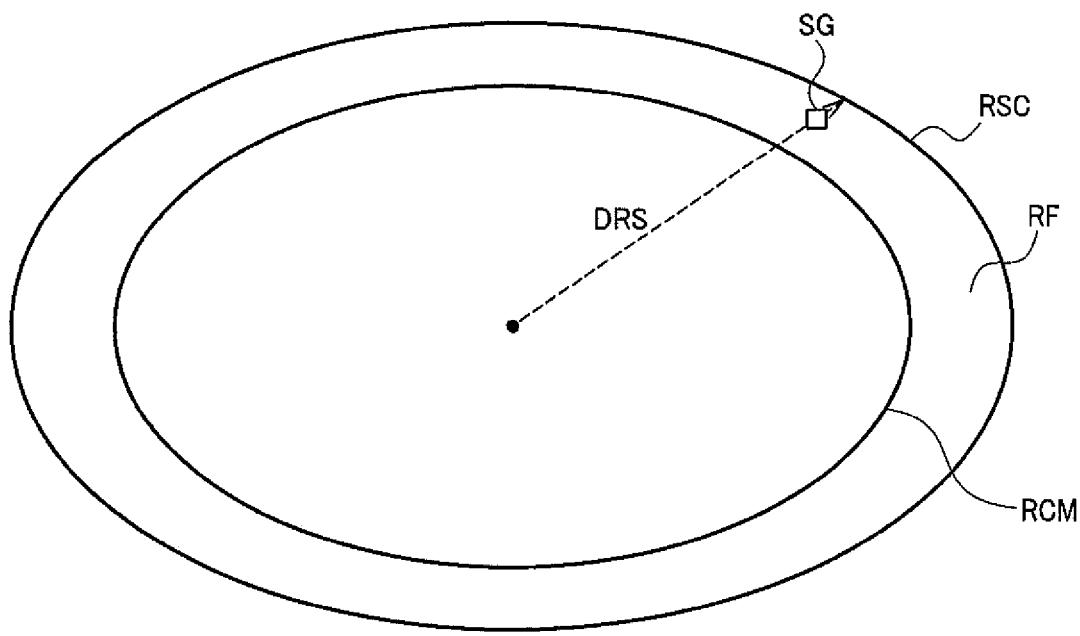

It is desirable to perform the display control process illustrated in FIGS. 22A and 22B on the sight object SG.

For example, when the sight object SG is situated within the imaging range RCM of the imaging section 40 (see FIG. 22A), the sight object SG can be displayed within the projection image by detecting the emission direction DG using the method described above with reference to FIG. 13, and disposing the sight object SG on the straight line LG.

However, when the spotlight is situated outside the imaging range RCM, it is impossible to detect the emission direction DG as described above with reference to FIG. 13, and display the sight object SG at an appropriate position. Specifically, the imaging range RCM is narrower than the projection area RSC onto which the projection image is projected. Therefore, the projection image is present within an area RF that is to situated within the projection area RSC and is situated outside the imaging range RCM, but the spotlight cannot be detected from the area RF. Accordingly, even if the player aims the emitting element 50 at the area RF so that a spotlight is formed in the area RF, it is impossible to display the sight object SG within the area RF using the method described above with reference to FIG. 13.

In FIGS. 22A and 22B, the display position of the sight object SG is shifted in the outward direction DRS that extends outward from the center of the imaging range RCM. Specifically, the display position of the sight object SG is shifted in the outward direction DRS with respect to the display position determined using the method described above with reference to FIG. 13. For example, when the display position of the sight object SG determined using the method described above with reference to FIG. 13 is situated in the vicinity of the boundary of the imaging range RCM, the display position of the sight object SG is shifted in the outward direction DRS so that the display position of the sight object SG is situated in the vicinity of the boundary of the projection area RSC. In this case, the accuracy of the display position of the sight object SG decreases. However, since the sight object SG is displayed (see FIG. 22B) even when the player aims the emitting element 50 at the area RF, it is possible to reduce or suppress a situation in which the player is given a wrong impression.

Although only some embodiments of the invention have been described in detail above, those skilled in the art would readily appreciate that many modifications are possible in the embodiments without materially departing from the novel teachings and advantages of the invention. Accordingly, all such modifications are intended to be included within scope of this invention. Any term cited with a different term having a broader meaning or the same meaning at least once in the specification and the drawings can be replaced by the different term in any place in the specification and the drawings. The projection image generation method, the spotlight position detection method, the hit determination method, and the like are not limited to those described above in connection with the embodiments. Methods equivalent to those described above in connection with the embodiments are included within the scope of the invention. The invention may be applied to various games. The invention may be applied to various image generation systems such as an arcade game system, and a large-scale attraction system that allows a number of players to participate.

The invention may also be applied to a head tracking system and stereoscopy that utilizes eyeglasses. When applying the invention to a head tracking system, it is possible to implement more natural movement of the image and the sight by determining a representative viewpoint position of the player based on the position of the head, and performing the image correction process and the sight correction process corresponding to the representative viewpoint position.

When applying the invention to stereoscopy, the substitute plane drawing process and the image distortion correction process are performed corresponding to the right viewpoint position and the left viewpoint position of the player, and the resulting two images are synthesized to obtain a stereoscopic image. The representative viewpoint position may be used as the starting point of the straight line that determines the bullet firing direction (see above). Note that this process is performed using a single point (e.g., the center position between the eyes) without dividing the representative viewpoint corresponding to the left eye and the right eye. This makes it possible to implement stereoscopy, and provide a more realistic or vivid image.

What is claimed is:

1. An image generation system comprising:
   a processor comprising hardware,
   the processor being configured to implement:
   an object space setting process that sets an object space;
   an image generation process that generates a projection image based on information about a plurality of objects that are disposed in the object space, the projection image being an image projected onto a projection screen by a projection device via an optical system of the projection device, the projection screen being a screen that is configured by one curved surface or a plurality of surfaces, the image generation process including a distortion correction process based on shape information about the projection screen;
   a process that receives a captured image from a camera that captures a projection area, the projection area being an area onto which the projection image is projected; and
   a hit determination process that calculates a screen spotlight position based on a position of a spotlight within the captured image and the shape information about the projection screen, calculates a direction from a set position toward the screen spotlight position to be an emission direction of an emitting element, and determines whether or not an object among the plurality of objects disposed in the object space has been hit based on the calculated emission direction, the screen spotlight position being a position of the spotlight on the projection screen, the spotlight being formed by light emitted from the emitting element, and the set position being set to be a representative position of the emitting element or a player.

2. The image generation system as defined in claim 1, wherein the processor is configured to implement the hit determination process that calculates a direction vector of the spotlight viewed from the camera based on the position of the spotlight within the captured image, and calculates a position of an intersection of a straight line that extends along the direction vector with the projection screen, to be the screen spotlight position.

3. The image generation system as defined in claim 1, wherein the processor is configured to implement the image generation process that determines a color of a pixel on a drawing buffer using a straight line as a line of sight of a virtual camera, the straight line connecting a position of an intersection and a representative viewpoint position, the intersection being an intersection of a light ray with the projection screen, the light ray being emitted through an optical system of the projection device corresponding to the pixel on the drawing buffer.

4. The image generation system as defined in claim 1, wherein the processor is configured to implement the image generation process that calculates a vertex position of a drawing object on a drawing buffer based on a position of an intersection of a straight line with the projection screen, and draws the drawing object on the drawing buffer based on the vertex position, the drawing object corresponding to the object, and the straight line connecting the vertex position of the object in the object space and a representative viewpoint position.

5. The image generation system as defined in claim 1, wherein the processor is configured to implement the object space setting process that calculates a position of a sight object that is disposed in the object space based on the emission direction, and disposes the sight object at the calculated position, the sight object representing a sight of the emitting element.

6. The image generation system as defined in claim 5, wherein the processor is configured to implement the object space setting process that disposes the sight object on a straight line that extends along the emission direction.

7. The image generation system as defined in claim 1, wherein the processor is configured to implement the image generation process that generates the projection image in which a detection adjustment object for adjusting detection of the spotlight is displayed within an imaging range of the camera.

8. The image generation system as defined in claim 7, wherein the processor is configured to implement the object space setting process that disposes the detection adjustment object in the object space so that the detection adjustment object is displayed within the imaging range of the camera that is situated within the projection area onto which the projection image is projected.

9. The image generation system as defined in claim 1, wherein the processor is configured to implement an imaging range determination process that determines an imaging range of the camera based on a second captured image obtained by capturing the projection image, or historical information about a detection position of the spotlight.

10. The image generation system as defined in claim 1, further comprising:
the camera,
wherein the camera comprises an image sensor and a fish-eye lens.

11. The image generation system as defined in claim 10, further comprising:
the projection device,
wherein the camera is provided to the projection device.

12. An image generation system comprising:
a processor comprising hardware;
a projection device that projects a projection image;
an imaging section that captures a projection area onto which the projection image is projected; and
an emitting element that emits light,
wherein the processor is configured to implement:
an object space setting process that sets an object space;
an image generation process that generates the projection image based on information about a plurality of objects that are disposed in the object space, the projection image being an image projected onto a projection screen by the projection device via an optical system of the projection device, the projection screen being a screen that is configured by one curved surface or a plurality of surfaces, the image generation process including a distortion correction process based on shape information about the projection screen; and
a hit determination process that calculates an emission direction of the emitting element based on the shape information about the projection screen and a captured image that has been captured by the imaging section, and determines whether or not an object among the plurality of objects disposed in the object space has been hit based on the calculated emission direction, and
wherein the imaging section comprises an image sensor and a fish-eye lens.

13. An image generation method comprising:
performing an object space setting process that sets an object space;
performing an image generation process that generates a projection image based on information about a plurality of objects that are disposed in the object space, the projection image being an image projected onto a projection screen by a projection device via an optical system of the projection device, the projection screen being a screen that is configured by one curved surface or a plurality of surfaces, the image generation process including a distortion correction process based on shape information about the projection screen;
performing a process that receives a captured image from a camera that captures a projection area, the projection area being an area onto which the projection image is projected; and
performing a hit determination process that calculates a screen spotlight position based on a position of a spotlight within the captured image and the shape information about the projection screen, calculates a direction from a set position toward the screen spotlight position to be an emission direction of an emitting element, and determines whether or not an object among the plurality of objects disposed in the object space has been hit based on the calculated emission direction, the screen spotlight position being a position of the spotlight on the projection screen, the spotlight being formed by light emitted from the emitting element, and the set position being set to be a representative position of the emitting element or a player.

14. A computer-readable information storage medium storing a program that causes a computer to execute the image generation method as defined in claim 13.

* * * * *